United States Patent
Ooki

(10) Patent No.: US 7,406,167 B2
(45) Date of Patent: Jul. 29, 2008

(54) EXCHANGE SYSTEM AND METHOD USING ICONS FOR CONTROLLING COMMUNICATIONS BETWEEN PLURALITY OF TERMINALS

(75) Inventor: Yasuomi Ooki, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 931 days.

(21) Appl. No.: 10/341,458

(22) Filed: Jan. 14, 2003

(65) Prior Publication Data

US 2003/0133562 A1   Jul. 17, 2003

(30) Foreign Application Priority Data

Jan. 17, 2002   (JP)   ............................. 2002-008840

(51) Int. Cl.
*H04M 3/00* (2006.01)
*H04M 5/00* (2006.01)

(52) U.S. Cl. ................... 379/242; 379/247; 379/265.09

(58) Field of Classification Search ................. 379/242, 379/265.09, 297, 247; 706/45; 370/352; 715/744; 709/202; 455/566
See application file for complete search history.

(56) References Cited

U.S. PATENT DOCUMENTS

| | | | | |
|---|---|---|---|---|
| 5,471,525 | A | * | 11/1995 | Domoto et al. ............. 379/247 |
| 6,014,135 | A | * | 1/2000 | Fernandes .................... 715/744 |
| 6,052,461 | A | * | 4/2000 | Lam ........................... 379/297 |
| 6,240,405 | B1 | * | 5/2001 | Suzuki ........................ 706/45 |
| 6,393,307 | B1 | * | 5/2002 | Kim ........................... 455/566 |
| 6,675,194 | B1 | * | 1/2004 | Pinard et al. ................. 709/202 |
| 6,778,661 | B1 | * | 8/2004 | Yumoto et al. ......... 379/265.09 |
| 6,934,277 | B1 | * | 8/2005 | Werve et al. ................. 370/352 |

FOREIGN PATENT DOCUMENTS

| | | |
|---|---|---|
| JP | H09-062632 A | 3/1997 |
| JP | H11-259393 A | 9/1999 |
| JP | 2000-278725 A | 10/2000 |

* cited by examiner

*Primary Examiner*—Thjuan K Addy
(74) *Attorney, Agent, or Firm*—Sughrue Mion, PLLC

(57) ABSTRACT

The present invention provides an exchange system which makes it possible to control connection and disconnection between terminals by an operation method which can be intuitively recognized. The exchange system includes display means for displaying icons of various terminals on screens of the terminals, detection means for detecting association between the icons performed on the screens of the terminals, and control means for controlling connection and disconnection between the terminals and/or connection and disconnection between an exchange apparatus and the terminals depending on the contents of the association.

32 Claims, 23 Drawing Sheets

EXCHANGE SYSTEM AND METHOD USING ICONS FOR CONTROLLING COMMUNICATIONS BETWEEN PLURALITY OF TERMINALS

BACKGROUND OF THE INVENTION

1. Field of the Invention

The present invention relates to an exchange system and an exchange method, and more particularly, to an exchange system and an exchange method which connect extension terminals to each other and connect an extension terminal to an outside terminal.

2. Description of the Related Art

In a conventional telephone exchange and the like, when a connection change operation (e.g., transfer) is performed, the following button operations are required. That is, (1) a hold button is depressed, (2) a destination is dialed, and (3) a transfer button is depressed.

When a function is allocated to a button such as a short-cut key, a function button, and a one-touch button, one function can be executed by depressing one button once. However, in order to realize this, a user must perform a registration operation such as short-cut key allocation in advance. Since one button is occupied for one function, a large number of buttons are required, and a long period of time is required to search for a button to which a specific function is allocated, or an erroneous button is depressed. In a television conference system and the like, the following button operations are required. That is, (1) a button is depressed, (2) menu 1 is selected, and (3) menu 2 is selected. A long period of time is required to search for a target function.

In terminals and the like of a conventional telephone exchange, when a plurality of terminals, outside lines, devices transmit calls to a terminal and are connected to the terminal, it is very difficult for the terminal to recognize all of these. For this reason, the terminal cannot respond to an important incoming call.

For example, when incoming calls from a plurality of terminals or outside lines are received by a terminal, in order for the terminal to recognize the terminals which transmit the calls, only pieces of information of one or two of the terminals or lines are displayed, or an information display of a currently connected destination is concealed by an incoming information display. Furthermore, the displayed information is displayed with characters of telephone numbers, extension numbers, names, and types, so that an entire connection relation cannot be visually understood.

In a conventional telephone exchange and the like, in order to change a connection state between a certain terminal and an outside line or a device, the terminal must be operated, and the connection state cannot be easily managed and changed by a related terminal, a dedicated management terminal, and the like. A terminal is imaginary posed as the terminal, or a dedicated function must be mounted on the exchange apparatus.

SUMMARY OF THE INVENTION

The present invention has been made in consideration of the above disadvantages, and has an object to provide an exchange system and an exchange method which make it possible to control connection and disconnection, and the like between terminals by an operation method which can be intuitively recognized. According to an aspect of the present invention, there is provided an exchange system comprising: display means for displaying icons of various terminals on screens of terminals; detection means for detecting association between the icons performed on the screens of the terminals; and control means for controlling connection and disconnection between the terminals and/or connection and disconnection between an exchange apparatus and the terminal depending on the contents of the association.

The exchange system may further comprise: means for displaying an icon of a destination terminal and an icon of a registered terminal on the screens of the terminals; means for detecting that an association operation between the icon of the destination terminal and the icon of the registered terminal serving as a second terminal is performed on the screen of a first terminal; and means for generating a call from the first terminal to the second terminal when the association operation between the icon of the destination terminal and the icon of the registered terminal serving as the second terminal is detected.

The exchange system may further comprise: means for displaying an icon of a destination terminal and an icon of a call originating terminal on the screens of the terminals; means for activating the icon of the call originating terminal displayed on the screen of the second terminal when a call sent from the first terminal to the second terminal is generated; means for detecting that an association operation between the icon of the destination terminal and the icon of the call originating terminal is performed on the screen of the second terminal; and means for establishing connection between the first terminal and the second terminal when the association operation between the icon of the destination terminal and the icon of the call originating terminal is detected on the screen of the second terminal.

The exchange system may further comprise: means for displaying the icon of the destination terminal and an icon of a holding terminal on the screens of the terminals; means for detecting that an association operation between the icon of the destination terminal and the icon of the holding terminal is performed on a screen of a certain terminal; and means for setting the certain terminal in a telephone call holding state when the association operation between the icon of the destination terminal and the icon of the holding terminal is detected on the screen of the certain terminal.

In the exchange system, the icon of the holding terminal may be increased to a plurality of icons of the holding terminals, and a melody used in the holding state may be changed depending on the icon of the holding terminal associated with the icon of the destination terminal.

The exchange system may further comprise: means for displaying an icon of a destination terminal and an icon of a holding terminal on the screens of the terminals; means for detecting that an association operation between the icon of the destination terminal and the icon of the holding terminal is performed on a screen of a certain terminal; and means for connecting a holding destination terminal and a destination terminal which is communicating with the certain terminal when the association operation between the icon of the destination terminal and the icon of the holding terminal is detected on the screen of the certain terminal.

The exchange system may further comprise: means for displaying an icon of a destination terminal, an icon of a self-terminal, and a graphic connecting the icon of the destination terminal and the icon of the self terminal on the screens of the terminals; means for detecting that the graphic is operated on a screen of a certain terminal; and means for switching a telephone call direction between the certain terminal and a destination terminal with which the certain terminal communicates when the graphic is operated on the screen of the certain terminal.

The exchange system may further comprise: means for displaying an icon of a call originating terminal and an icon of a recording terminal on the screens of the terminals; means for detecting that an association operation between the icon of the call originating terminal and the icon of the recording terminal is performed on a screen of a certain terminal; and means for recording voice from the call originating terminal when the association operation between the icon of the call originating terminal and the icon of the recording terminal is detected on the screen of the certain terminal.

The exchange system may further comprise: means for displaying an icon of a call originating terminal and an icon of a recording device on the screens of the terminals; means for detecting that an association operation between the icon of the call originating terminal and the icon of the recording device is performed on a screen of a certain terminal; and means for recording voice from the call originating terminal when the association operation between the icon of the call originating terminal and the icon of the recording device is detected on the screen of the certain terminal.

The exchange system may further comprise: means for displaying an icon of a destination terminal and an icon of a recording device on the screens of the terminals; means for detecting that an association operation between the icon of the destination terminal and the icon of the recording device is performed on a screen of a certain terminal; and means for recording voice of telephone conversation between the certain terminal and the destination terminal with which the certain terminal communicates when the association operation between the icon of the destination terminal and the icon of the recording device is detected on the screen of the certain terminal.

In the exchange system, the control means may comprise means for transmitting a connection request message from the terminals to the exchange apparatus, said connection request message including a connection request table having source information, destination information, and a connection direction depending on the contents of association detected by the detection means.

In the exchange system, the exchange apparatus may comprise means for updating, on the basis of the contents of the connection request table included in the connection request message received from the terminals and the contents of a current connection information table, the contents of the connection information table.

In the exchange system, the exchange apparatus may further comprise means for transmitting a connection table updating notice message including the updated connection information table to a related terminal.

In the exchange system, each of the terminals may comprise means for updating a display of the screen on the basis of the connection information table included in the connection table updating notice message received from the exchange apparatus.

In the exchange system, when a plurality of terminals receive data of the same contents from the exchange apparatus, only a piece of data may be transmitted from the exchange apparatus to the extension line.

DETAILED DESCRIPTION OF THE PREFERRED EMBODIMENTS

According to the present invention, a media exchange apparatus such as a telephone exchange and a server which performs connection control between terminals such as telephones, mobile telephones, personal computers (PC), and mobile information terminals (PDA) is provided. The terminals notice only destination change information of respective terminals to the exchange apparatus to make it possible to change a destination terminal by an easy operation method such as a drag-and-drop operation on the terminals, without a conventional input operation of entering a specific number designated to each function to a terminal or a plurality of button operations. In addition, connection information is transmitted from the exchange apparatus to a terminal (or a remote management device and the like) to make it possible to easily recognize the connection information on the terminal (or the remote management device and the like).

Figure 1:
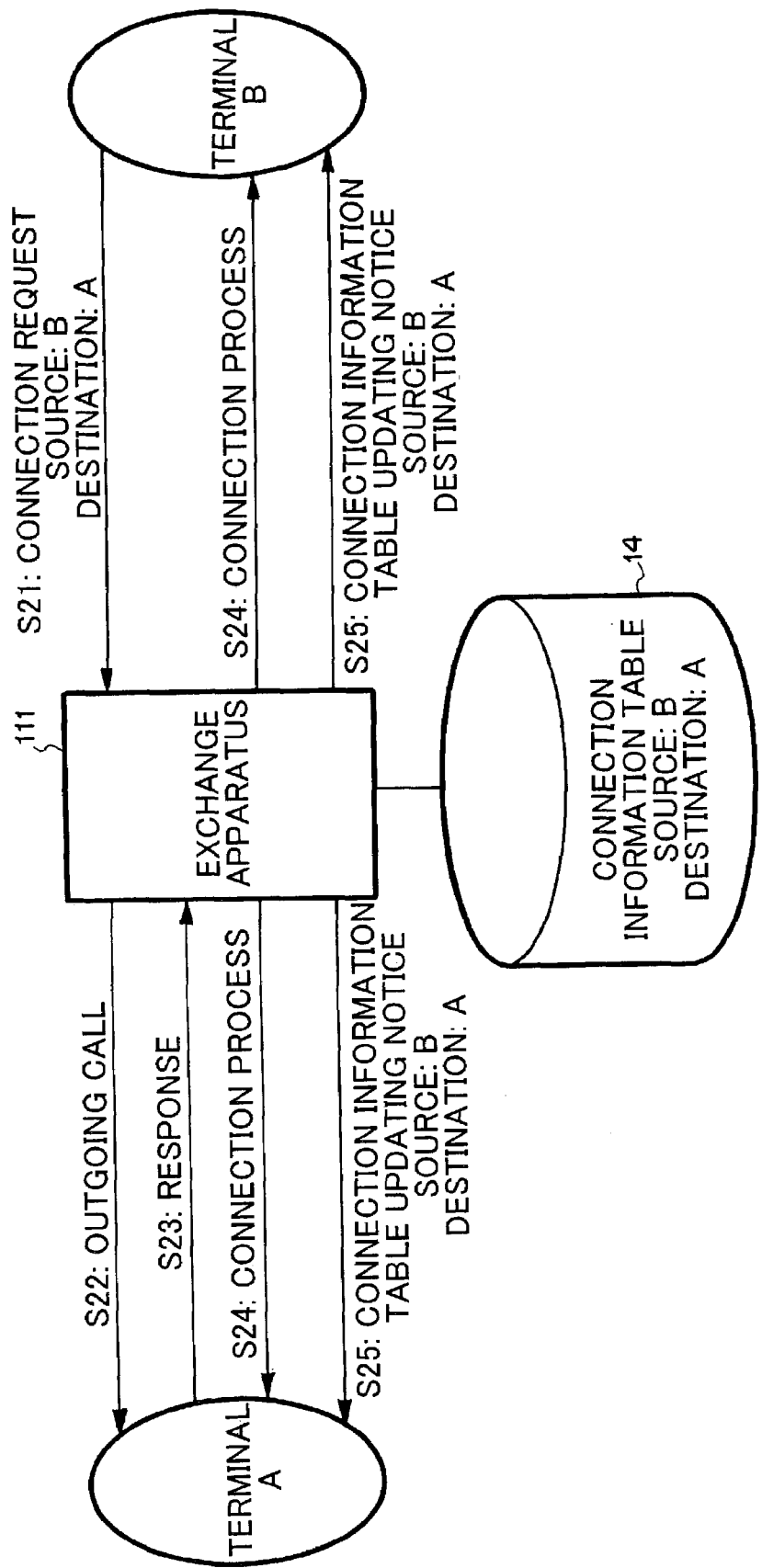
FIG. 1 is a first sequence diagram showing an operation of a media exchange system according to an embodiment of the present invention.

FIG. 1 is a conceptual diagram showing a sequence of connection.

Referring to FIG. 1, a terminal B transmits a connection request table which describes a request to connect the terminal B to a terminal A to an exchange apparatus 111 (step S21). Then, the exchange apparatus 111 transmits a signal to a terminal A (step S22) to check whether a response is replied from the terminal A (step S23). Next, the exchange apparatus 111 performs a connection process to the terminals A and B (step S24). Finally, the exchange apparatus 111 updates a current connection information table 14 and transmits the notice of updating of the connection information table to the terminal A and B (step S25). A display of the information of the connection information table is updated together with the information of the connection information table 14. In the example in FIG. 1, the terminal B and the terminal A are connected to each other by the request from the terminal B. However, the terminal B may be connected to two or more terminals, and the two or more terminals except for the terminal B may be connected to each other by the request from the terminal B.

Figure 2:
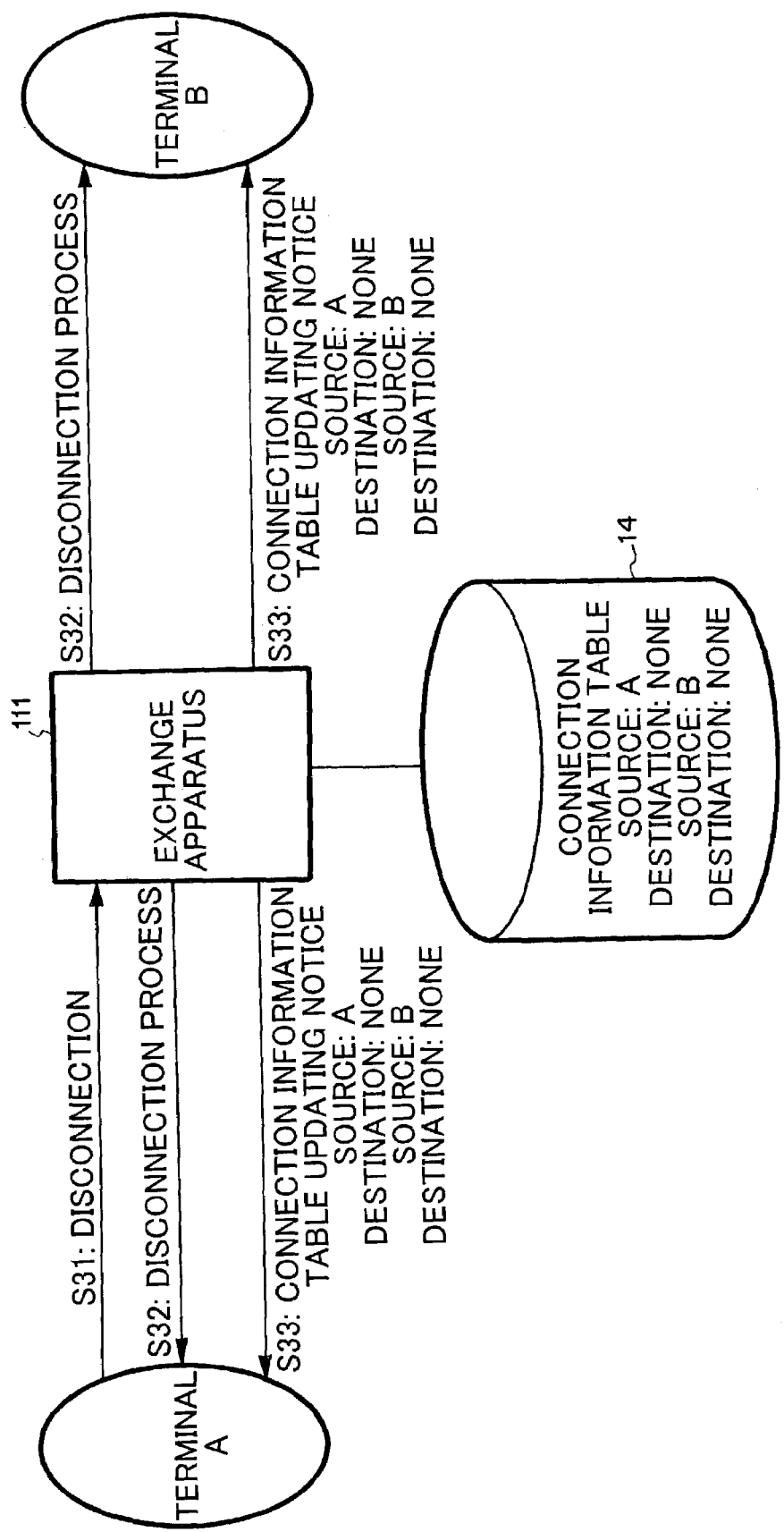
FIG. 2 is a second sequence diagram showing an operation of the media exchange system according to the embodiment of the present invention.

FIG. 2 is a conceptual diagram showing a sequence of disconnection.

The exchange apparatus 111 performs a disconnection process to the terminals A and B (step 32). Finally, the exchange apparatus 111 updates the current connection information table 14 and transmits the notice of updating of the connection information table to the terminals A and B (step S33).

Figure 3:
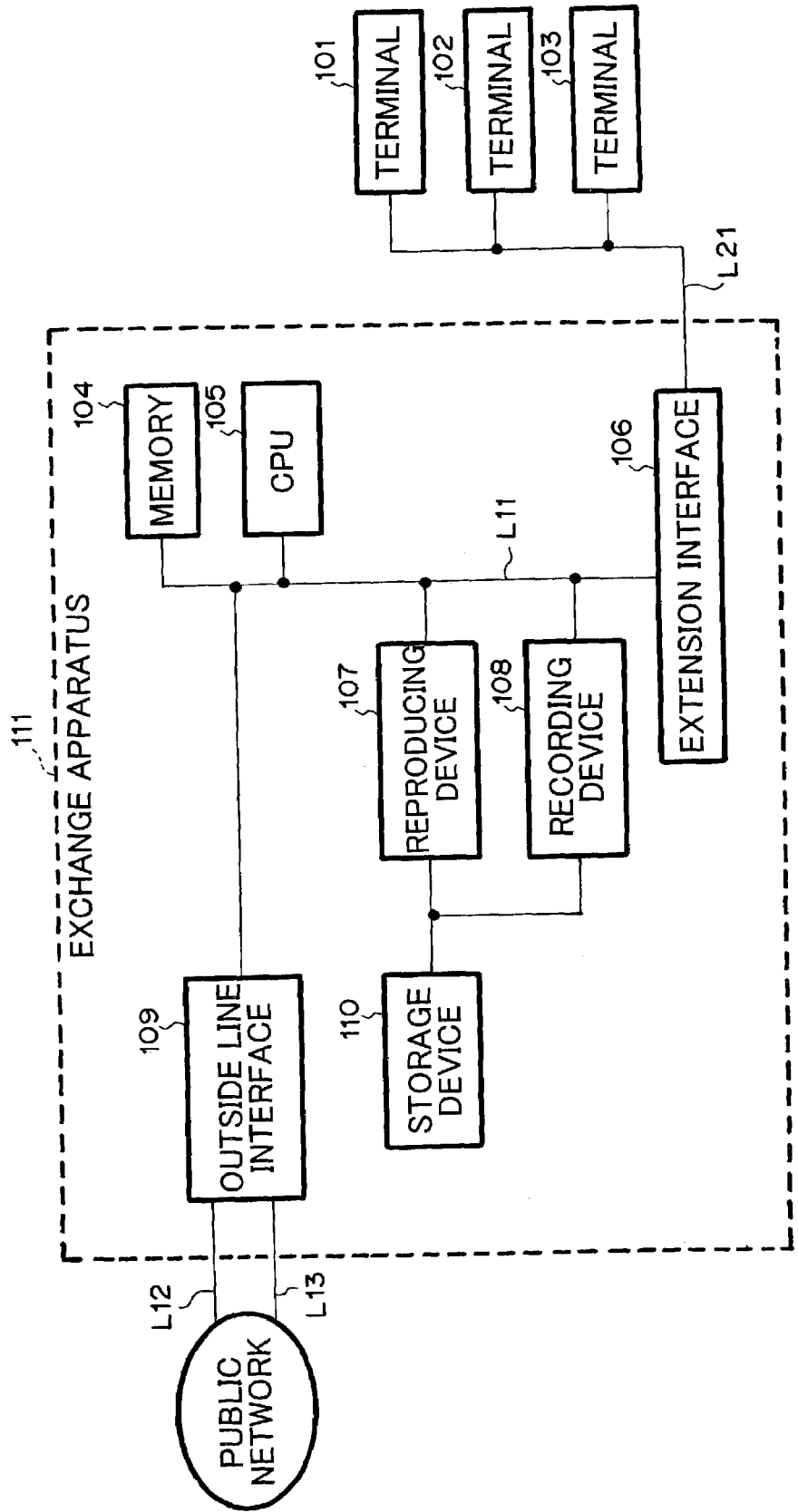
FIG. 3 is a block diagram showing the internal configuration or the like of an exchange apparatus according to the embodiment of the present invention.

FIG. 3 shows the entire configuration of the exchange apparatus 111 according to this embodiment and terminals 101 to 103 connected to the exchange apparatus 111. The exchange apparatus 111 is a telephone exchange, a server, and the like to control connection of media.

Reference numeral 106 denotes an extension interface; L11, an exchange apparatus internal circuit; 105, a CPU for entirely controlling the exchange apparatus 111; 104, a memory for storing a program executed by the CPU 105 and a current connection information table; 109, an outside line interface for controlling connection and disconnection between the terminals 101, 102, and 103 and a public network line; L12 and L13, outside lines connected to a public network; 110, a storage device in which voice data and music data are stored; 107, a reproducing device for reproducing voice data and music data stored in the storage device 110; and 108, a recording device for recording voice from the terminals 101, 102, and 103, music data sent from the terminals, and the like on the storage device.

It is assumed that the extension number of the terminal 101 is "101", the extension number of the terminal 102 is "102, and the extension number of the terminal 103 is "103". It is assumed that a user name using the terminal 101 is "A", a user name using the terminal 102 is "B", and a user name using the terminal 103 is "C".

Figure 4:
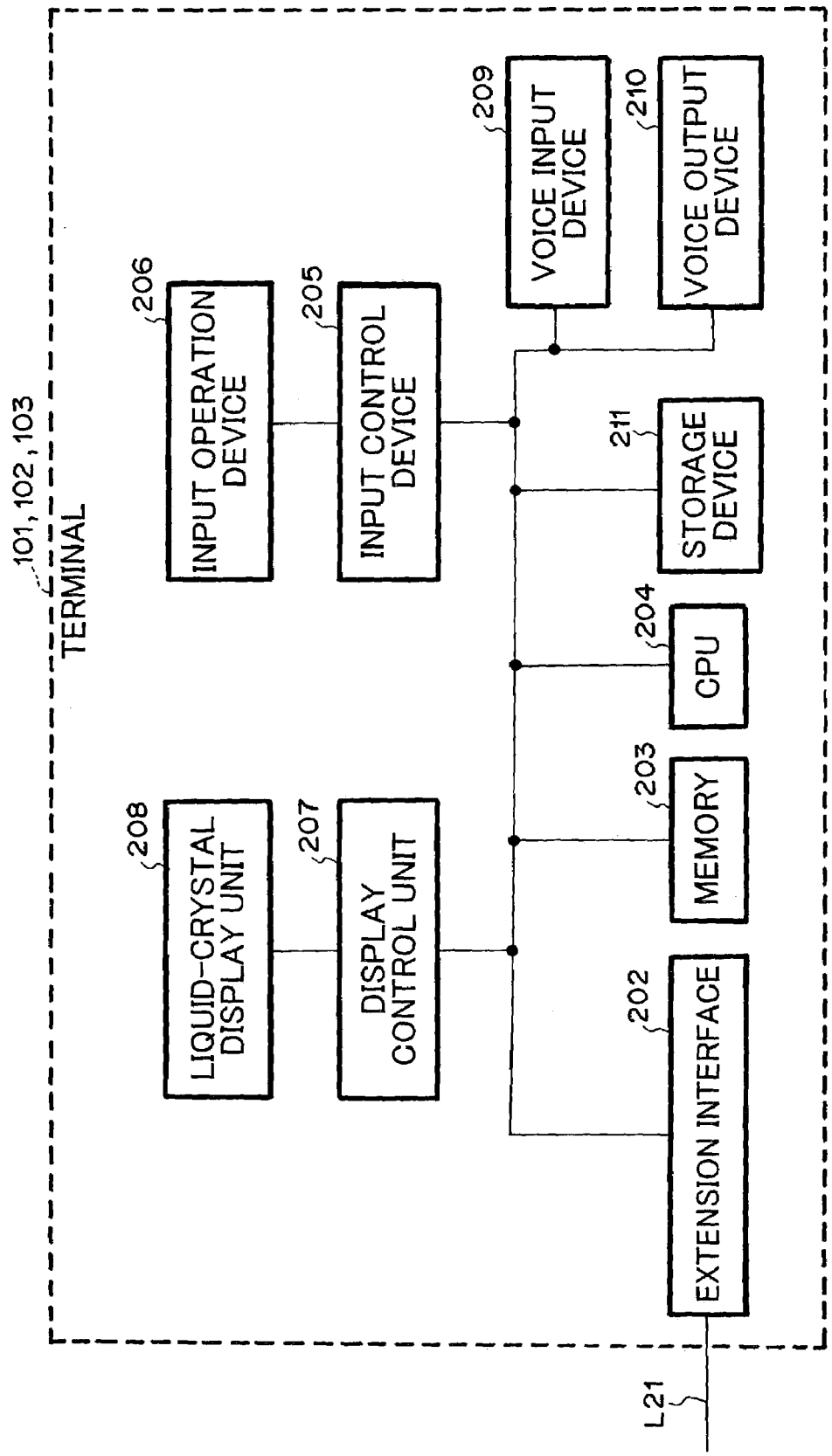
FIG. 4 is a block diagram showing the internal configuration of a terminal according to the embodiment of the present invention.

FIG. 4 shows the internal configurations of the terminals 101, 102, and 103. Reference numeral 202 denotes an extension interface for performing communication with the exchange apparatus 111 and other terminals; 204, a CPU for controlling whole the terminal; 203, a memory for storing a program executed by the CPU 204 and destination information; 206, an input device such as a mouse, a keyboard, and a button; and 205, a control device controlling the input device 206. Reference numeral 208 denotes a liquid-crystal display unit for displaying characters and images; and 207, a display control unit for controlling the liquid-crystal display unit 208. Reference numeral 209 denotes a voice input device such as a microphone; 210, a voice output device such as a loudspeaker; and 211, a storage device for storing music and voice.

The number of terminals connected to the exchange apparatus 111 depends on the processing ability of the exchange apparatus. However, the following description will be made with respect to a case in which the system accommodates three terminals. An extension line of any type may be used as an extension line L21 for connecting the exchange apparatus 111 and the terminals 101, 102, and 103. For example, a LAN or a conventional telephone line may be used. Any terminals each having the constituent elements in FIG. 4 may be used as the terminals 101, 102, and 103. For example, a telephone set, a personal computer, or a television set may be used.

In this embodiment, a telephone exchange is supposed to be an exchange apparatus, a personal computer is supposed to be a terminal, and a mouse is supposed to be the input device 206. The embodiment will describe cases in which a two-sided communication function, a transfer function, an answerphone recording function, and a call recording function which are basic functions of the telephone exchange are performed. A mouse operation such as clicking, dragging, and dropping is detected by the control device 205, and sent to the CPU 204 to be processed.

Figure 5:
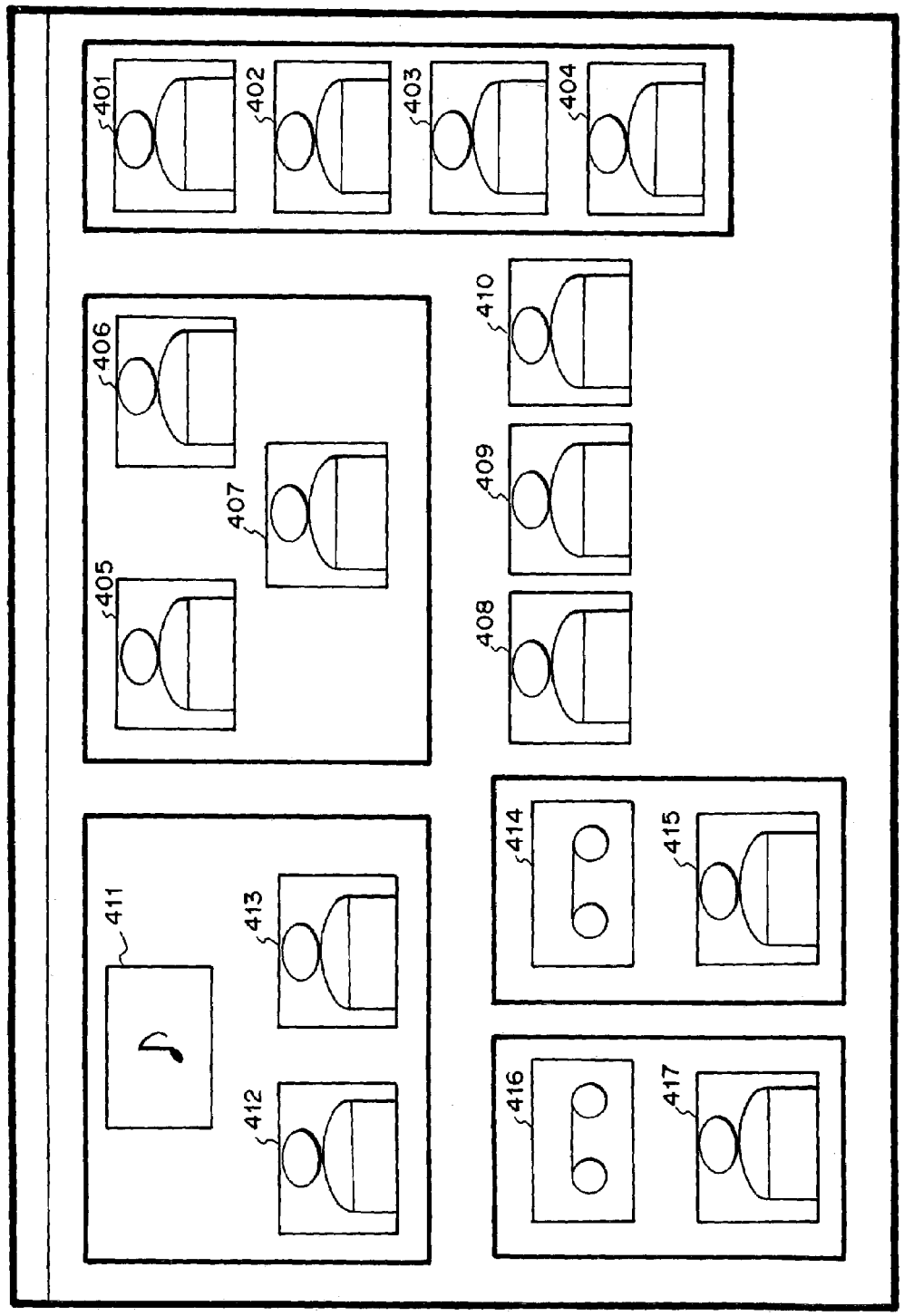
FIG. 5 is a diagram showing the configuration of a screen displayed by the terminal according to the embodiment of the present invention.

FIG. 5 shows a configuration of a screen displayed on the liquid-crystal display unit 208 of the terminal 101, 102, or 103. Reference numerals 401 to 404 denote icons of registered destinations. Either of extension and outside line can be registered as one of destinations. Reference numerals 408 to 410 denote icons representing terminals (call originating terminals) generating an incoming call received by the self-terminal. Reference numerals 405 and 406 denote icons for displaying terminals of destinations (destination terminals) for the self-terminal; and 407 denotes an icon representing the self-terminal. Reference numeral 411 denotes an icon representing a holding sound source; 412 and 413 denote icons representing terminals (holding terminals) which are listening to the holding sound source represented by the icon 411. Reference numeral 414 denotes an icon representing a recording device; and 415 denotes an icon representing a terminal (recording terminal) which is recording a voice on the recording device represented by the icon 414. Reference numeral 416 denotes an icon representing another recording device, and 417 denotes an icon representing a terminal which is recording a voice on the recording device represented by the icon 416.

In this embodiment, updating of a screen of icons and the like and operations such as a mouse operation on a screen will be described for only the terminal 101. A description of updating and operations of display screens in the other terminals 102 and 103 are omitted. Only notations of response operations, outgoing operations, and the like will be described with respect to the other terminals 102 and 103.

Figure 6:
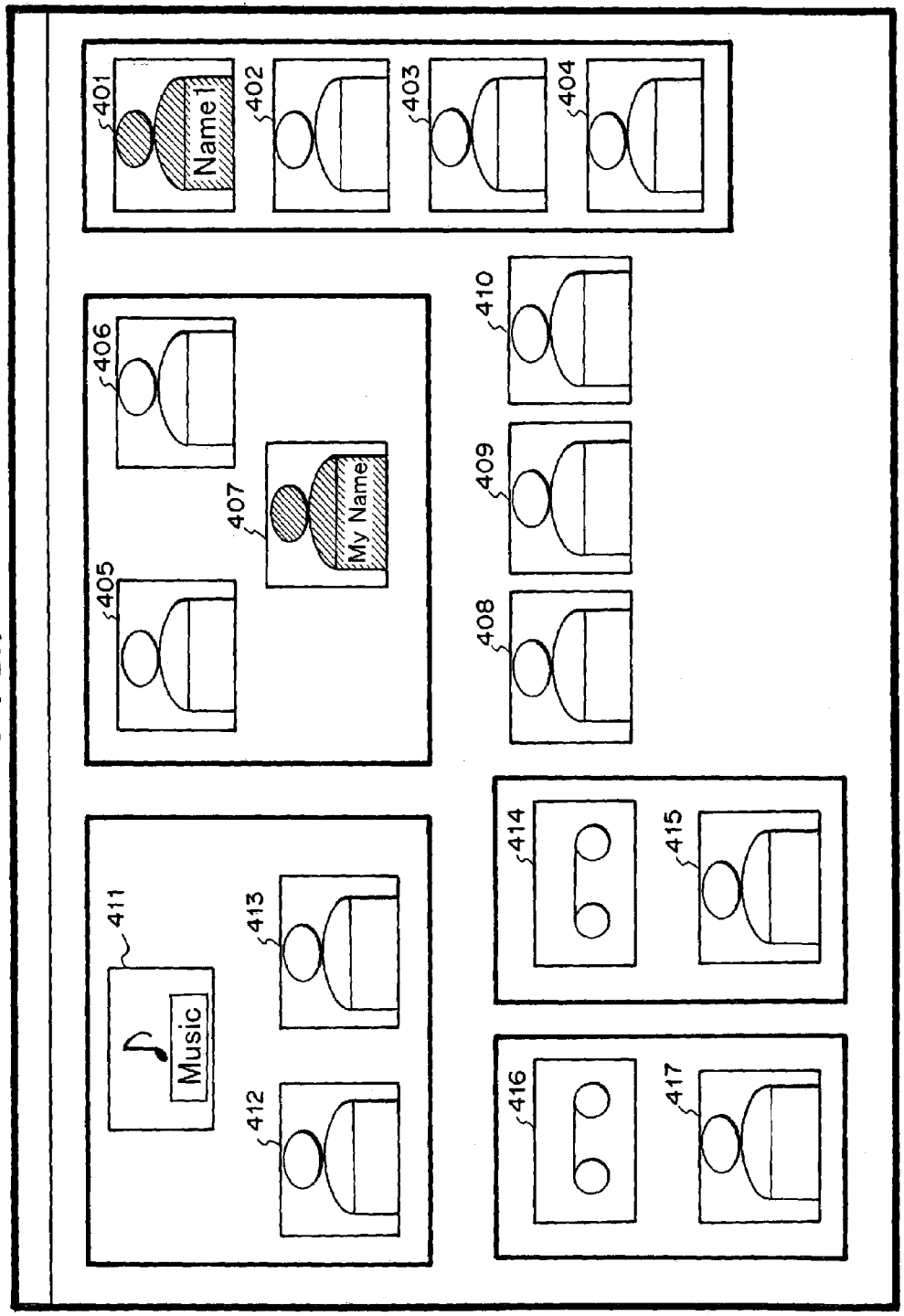
FIG. 6 is a diagram of a first screen displayed when two-sided communication is performed by terminals according to the embodiment of the present invention.

The two-sided communication will be described first. The terminal 101 transmits a signal to the outside line L12 to start communication. An initial screen of the liquid-crystal display unit 208 of the terminal 101 in this case is shown in FIG. 6. In the memory 203 of the terminal, source information (type: extension, telephone number 101, name A) and destination information (type: outside line, telephone number X, name Y) are registered in advance. On this screen, the icon 401 representing a registered terminal to be a destination and the icon 407 representing a self-terminal are displayed.

Figure 7:
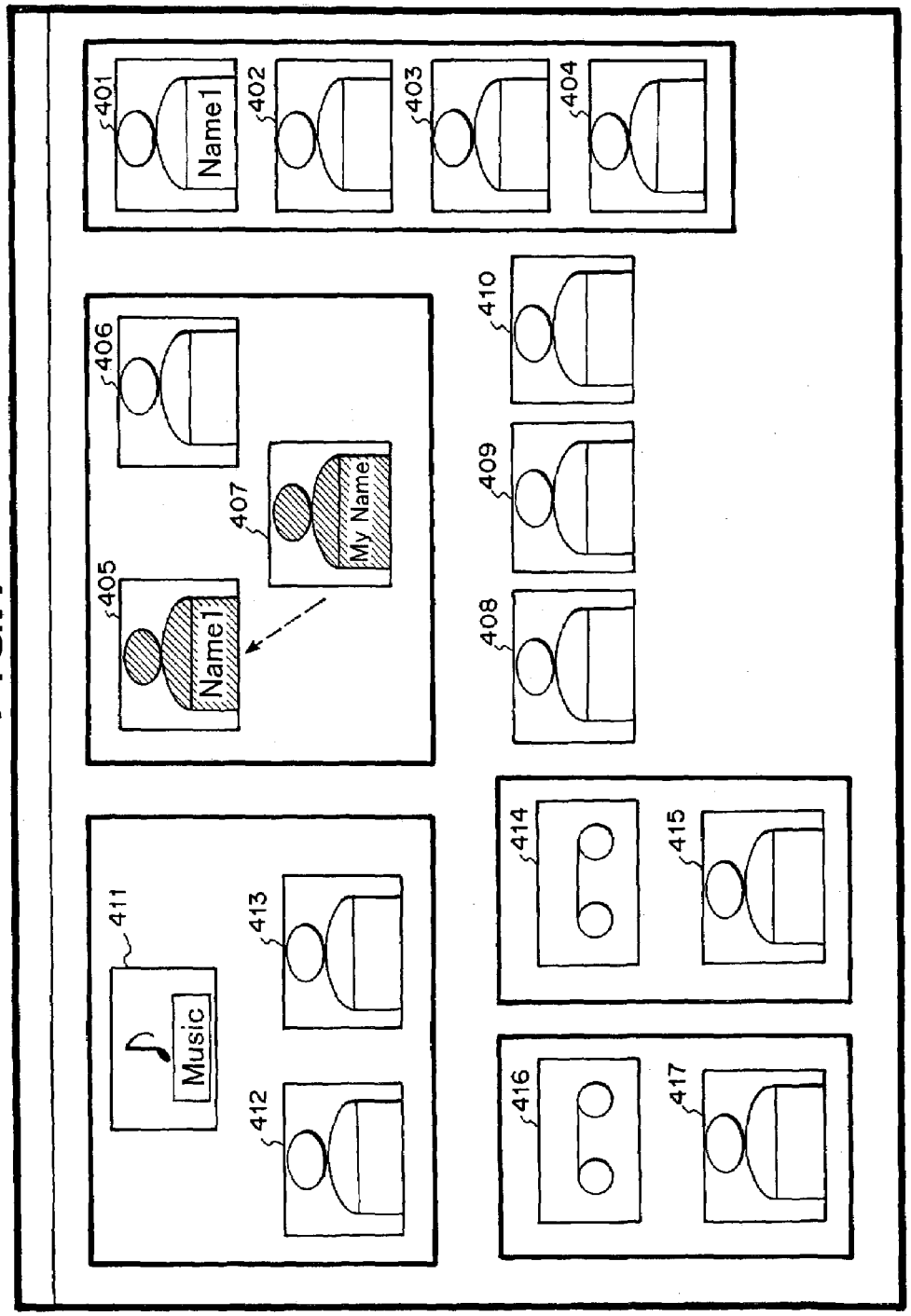
FIG. 7 is a diagram of a second screen displayed when two-sided communication is performed by terminals according to the embodiment of the present invention.

A user of the terminal 101 drags and drops the icon 401 of the registered destination to the icon 405 of the destination terminal by using the mouse. At this time, the screen as shown in FIG. 7 is displayed. On the screen as shown in FIG. 7, a unidirectional dotted arrow extending from the icon 407 representing the self-terminal 101 to the icon 405 of the destination terminal is displayed. With this display, the terminal 101 shows the user that the terminal 101 is calling the destination terminal represented by the icon 405.

Figure 8:
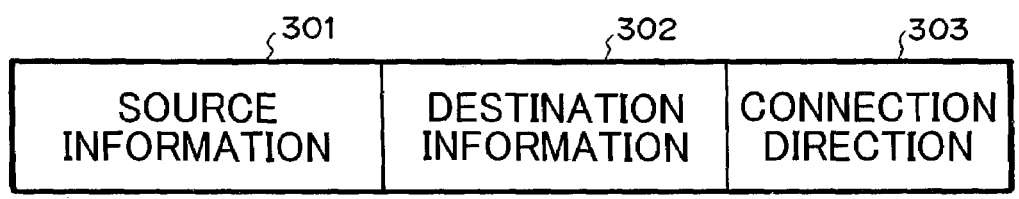
FIG. 8 is a diagram showing a structure of a connection request table according to the embodiment of the present invention.

At this time, the CPU 204 of the terminal 101 detects a mouse operation to decide that the self-terminal 101 is performing an outgoing operation to a destination (type: outside line, telephone number X, name Y) registered with the memory 203, and transmits a "connect request" message including a connection request tale having the table structure as shown in FIG. 8 to the exchange apparatus 111. At this time, source information (type: extension, telephone number 101, name A) is stored in a column 301 in FIG. 8, destination information (type: outside line, telephone number X, name Y) is stored in a column 302, and a connection direction (both directions) is stored in a column 303. When a plurality of connection requests are transmitted, a plurality of sets of columns 301 to 303 are formed, and these sets are transmitted together with the "connection request" message.

The connection request table is transmitted to the memory 104 through the extension interface 106. The CPU 105 of the exchange apparatus 111 compares the connection request table transmitted to the memory 104 with the current connection information table stored in the memory 104. The current connection information table has the table structure as shown in FIG. 8 like the connection request table. Since the exchange apparatus 111 has a plurality of current connection information tables constituted by the sets of columns 301 to 303, the exchange apparatus 111 can recognize connection states of all the terminals and all the devices. At this time, there is no current connection information table because communication is not performed. Therefore, the CPU 105 accepts a connection request represented by the transmitted connection request table to execute a connection process. More specifically, destination information (type: outside line, telephone number X, name Y) of the column 302 is read. Since the type is the outside line, an idle outside line, e.g., in this case, the outside line L12, is captured by the external interface 109, and the destination telephone number X is dialed.

Figure 9:
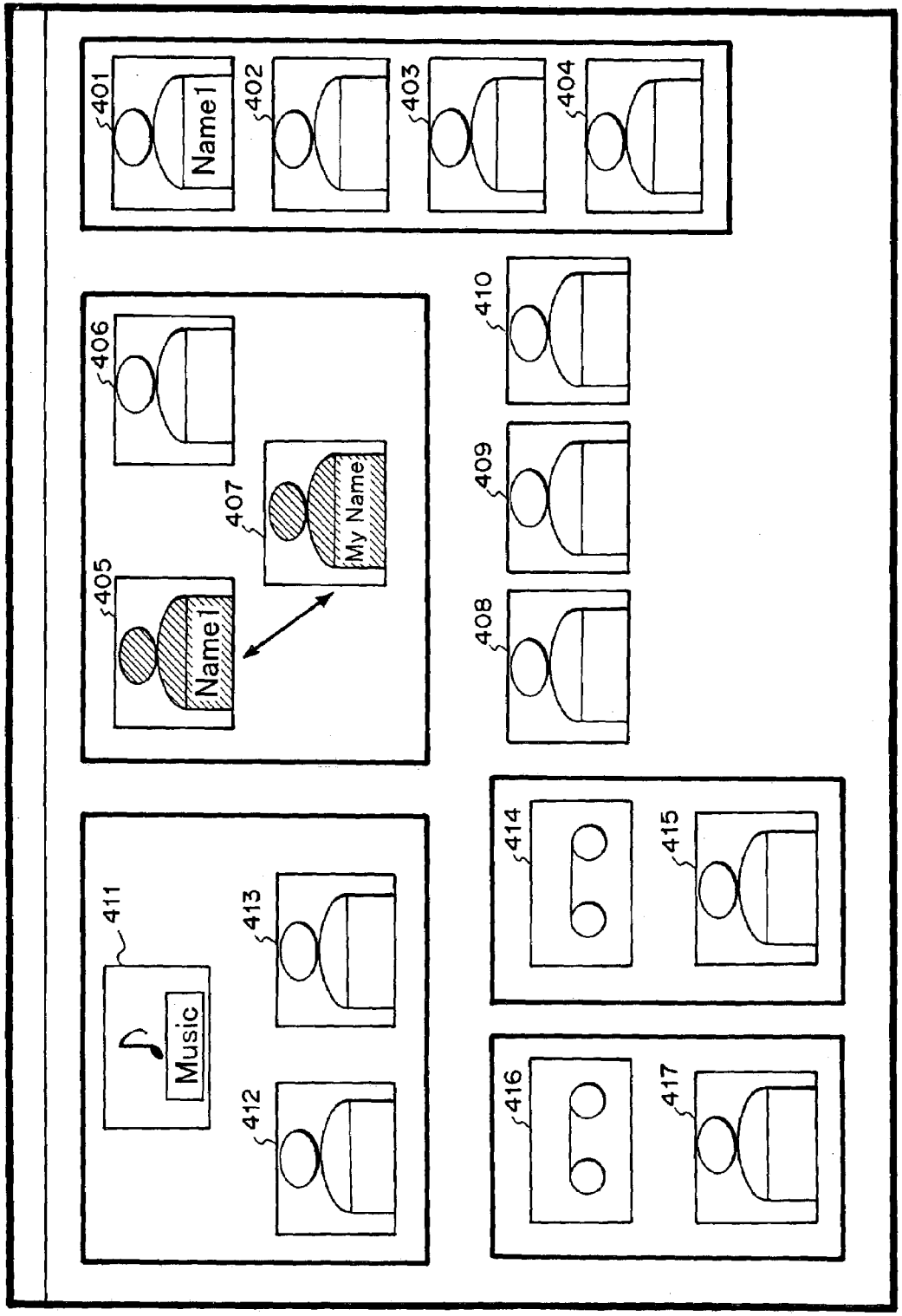
FIG. 9 is a diagram of a third screen displayed when two-sided communication is performed by the terminals according to the embodiment of the present invention.

When the destination responds, the exchange apparatus 111 executes a connection process between the outside line L12 and the terminal 101, generates a copy of the transmitted connection request table as a current connection information table, and then notices a "connection table updating notice" message including the current connection information table to the terminal 101. The terminal 101 which receives the current connection information recognizes that a connection path is changed into a state as represented by the transmitted current connection information table, updates the screen in FIG. 7 into a display screen as shown in FIG. 9, and notifies the user that two-sided communication is established. On the screen in FIG. 9, a bidirectional solid arrow is displayed between the icon 407 representing the self-terminal 101 and the icon 405 of the destination terminal.

When a user A performs a telephone conversation ending operation such as an operation of depressing an on-hook button to the terminal 101, the terminal 101 notifies the exchange apparatus 111 that it is desired to end the telephone conversation. The exchange apparatus 111 executes a disconnection process to the outside line L12 and the terminal 101, writes empty data in the current connection information table, and notifies the terminal 101 of "connection table updating notice" message including the current connection information table in which the empty data is written. The terminal 101 recognizes that the telephone call is disconnected because the received current connection table is empty, and the screen in FIG. 9 is set back to the screen as shown in FIG. 6.

Subsequently, a transfer operation will be described below. That is, a call is originated from the terminal 102 to the terminal 101, and a telephone call between the terminal 101 and the terminal 102 is started. In the middle of the telephone call, the terminal 101 holds the telephone call and sends a signal to an outside line (type: outside line, telephone number Y, name Z) to start a telephone call. Thereafter, the terminal 102 and the outside line are connected to each other by an operation of the terminal 101. Here, it is assumed that information (type: outside line, telephone number Y, name Z) is stored in the memory 203 of the terminal 101 in advance.

Figure 10:
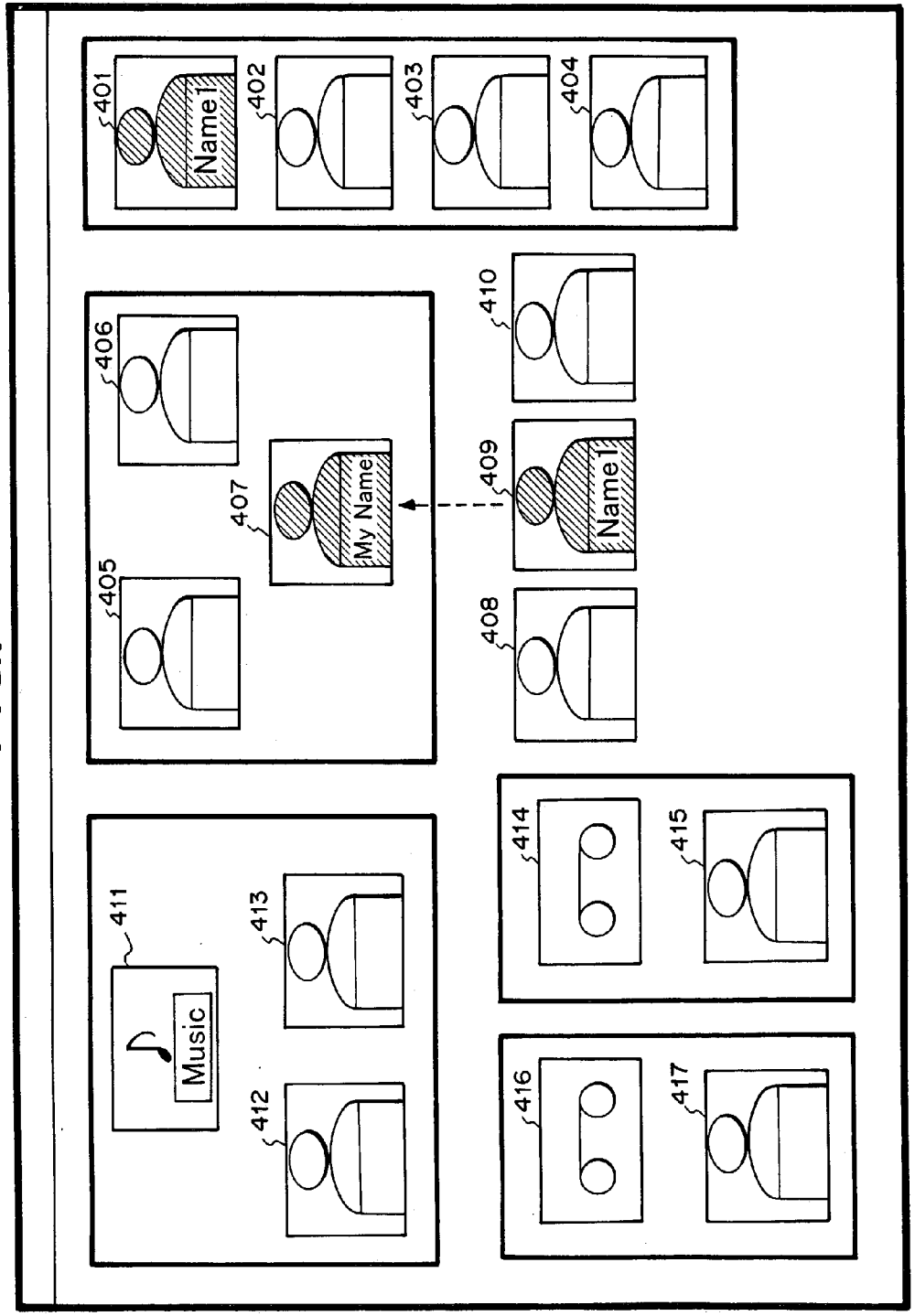
FIG. 10 is a diagram of a first screen displayed when transfer is performed by the terminal according to the embodiment of the present invention.

The terminal 102, first, transmits a "connection request" message representing that the terminal 102 desires to be connected to the terminal 101. Source information (type: extension, telephone number 102, name B) is stored in the column 301 as shown in FIG. 8 of the connection request table included in the connection request message, destination information (type: extension, telephone number 101, name A) is stored in the column 302, and a connection direction (both directions) is stored in the column 303. The exchange apparatus 111 which receives the "connection request" message notifies the terminal 101 that there is a call originated from the terminal 102 to the terminal 101. When the terminal 101 receives the notice, the self-terminal 101 updates the screen as shown in FIG. 6 into the screen as shown in FIG. 10 and notifies the user A that the call is received from the terminal 102. On the screen in FIG. 10, a unidirectional dotted arrow extending from the icon 409 representing the terminal 102 which transmits a call to the terminal 101 to the icon 407 representing the self-terminal 101 is displayed.

Figure 11:
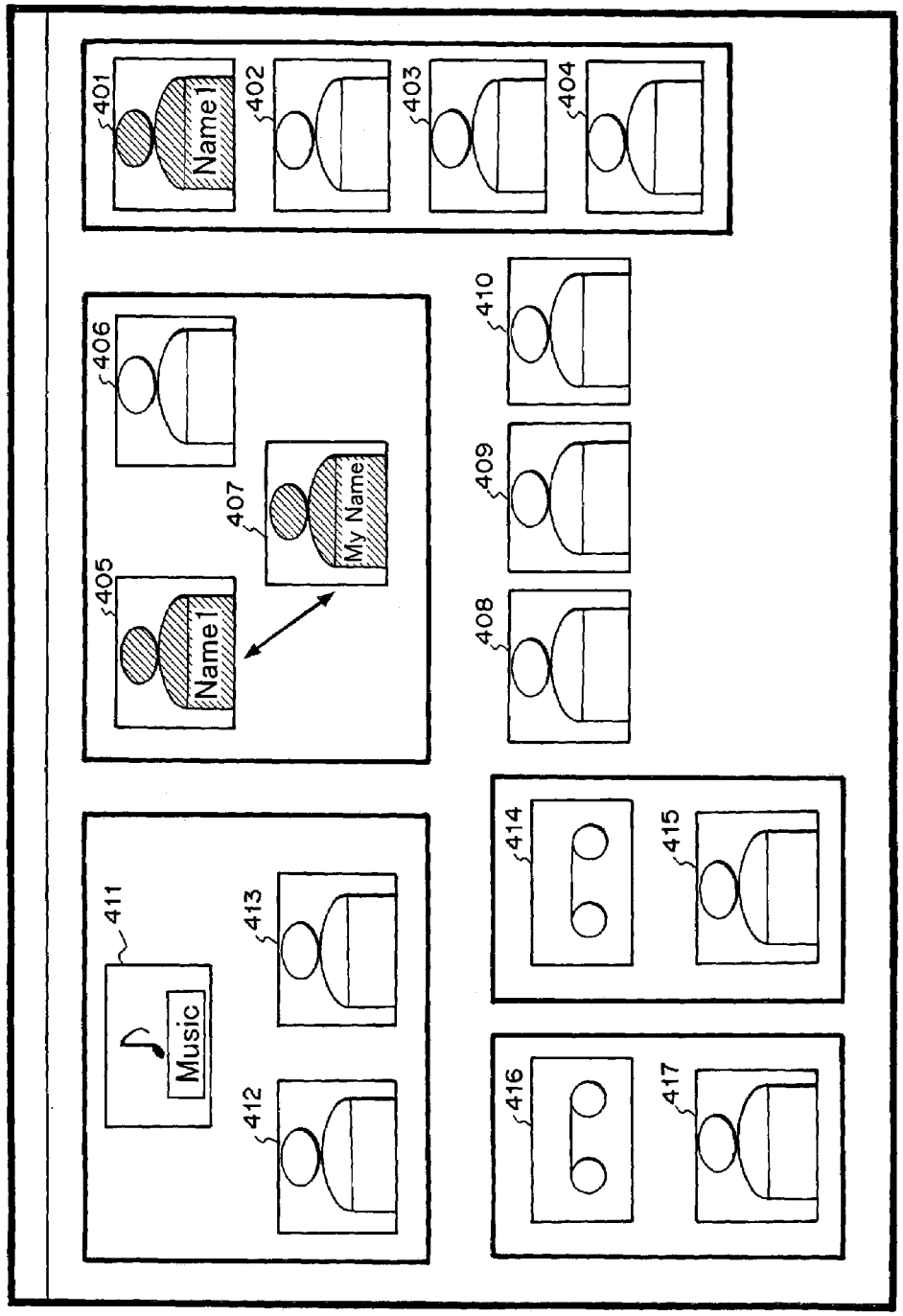
FIG. 11 is a diagram of a second screen displayed when transfer is performed by the terminal according to the embodiment of the present invention.

When the user A drags and drops the icon 409 representing the terminal 102 to the icon 405 representing the destination terminal by using the mouse to perform a response operation, the terminal 101 notifies the exchange apparatus 111 that the user A recognizes the incoming call. When the exchange apparatus 111 which receives the notice performs a connection process between the terminal 101 and the terminal 102, generates a copy of the connection request table received from the terminal 102 as a current connection table, and transmits a "connection table updating notice" message including the current connection table to the terminals 101 and 102. The terminal 101 which receives the "connection table updating notice" message updates the screen as shown in FIG. 10 into a screen as shown in FIG. 11 and notifies the user A that a telephone call is established. On the screen in FIG. 11, a bidirectional solid arrow is displayed between the icon 407 representing the self-terminal 101 and the icon 405 representing the destination terminal 102.

Thereafter, the user A drags and drops the icon 405 representing the terminal 102 to an icon 413 representing holding by using the mouse on the screen of the terminal 101 to hold the telephone call between the terminal 101 and the terminal 102. In this case, the terminal 101 transmits a "connection request" message including a connection request table having a table structure as shown in FIG. 8 to the exchange apparatus 111. At this time, source information (type: extension, telephone number 102, name B) is stored in the column 301 as shown in FIG. 8 of the connection request table, destination information (type: holding sound source 1, no telephone number, no name) is stored in the column 302, and a connection direction (inverted direction) is stored in the column 303. With respect to the connection direction, a forward direction is a direction extending from the source to the destination, and the inverted direction is a direction extending from the destination to the source.

Figure 12:
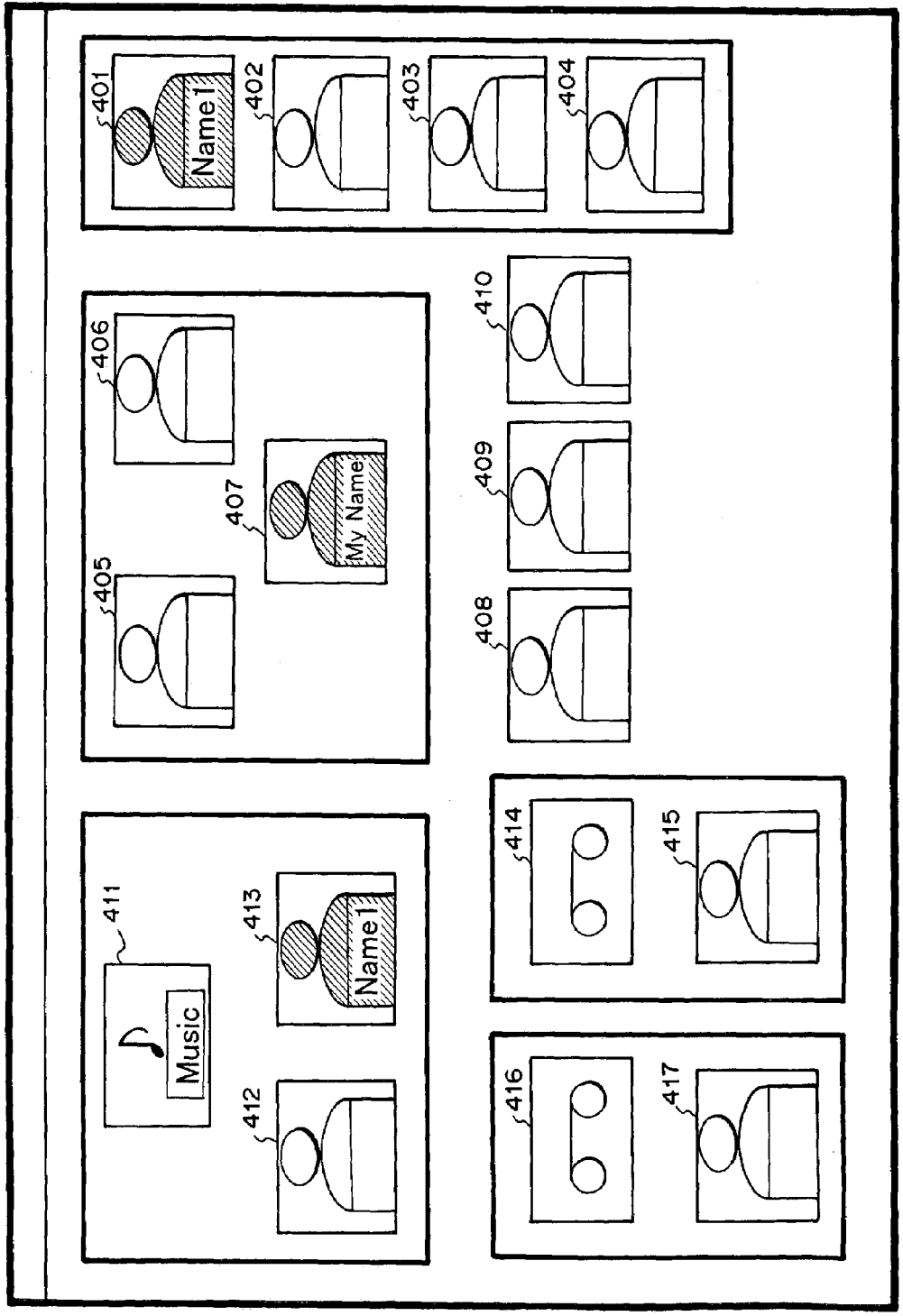
FIG. 12 is a diagram of a third screen displayed when transfer is performed by the terminal according to the embodiment of the present invention.

When the exchange apparatus 111 receives the "connection request" message from the terminal 101, the exchange apparatus 111 compares the connection request table included in the "connection request" message with the current connection information table, decides that the requested connection process can be executed, and executes the connection process. More specifically, the reproducing device 107 and the terminal 102 are connected to each other, and holding sound data is transmitted from the storage device 110 to the reproducing device 107. In this manner, holding sound is output from the terminal 102. Thereafter, a present current connection information table is replaced by the copy of the connection request table included in the "connection request" message received from the terminal 101, and the "connection table updating notice" message including the replaced current connection information table is transmitted to the terminals 101 and 102. When the terminal 101 receives the "connection table updating notice" message, the terminal 101 updates the screen as shown in FIG. 11 into a screen as shown in FIG. 12. On the screen as shown in FIG. 12, the terminal 102 is displayed as the icon 413 representing a holding terminal.

Figure 13:
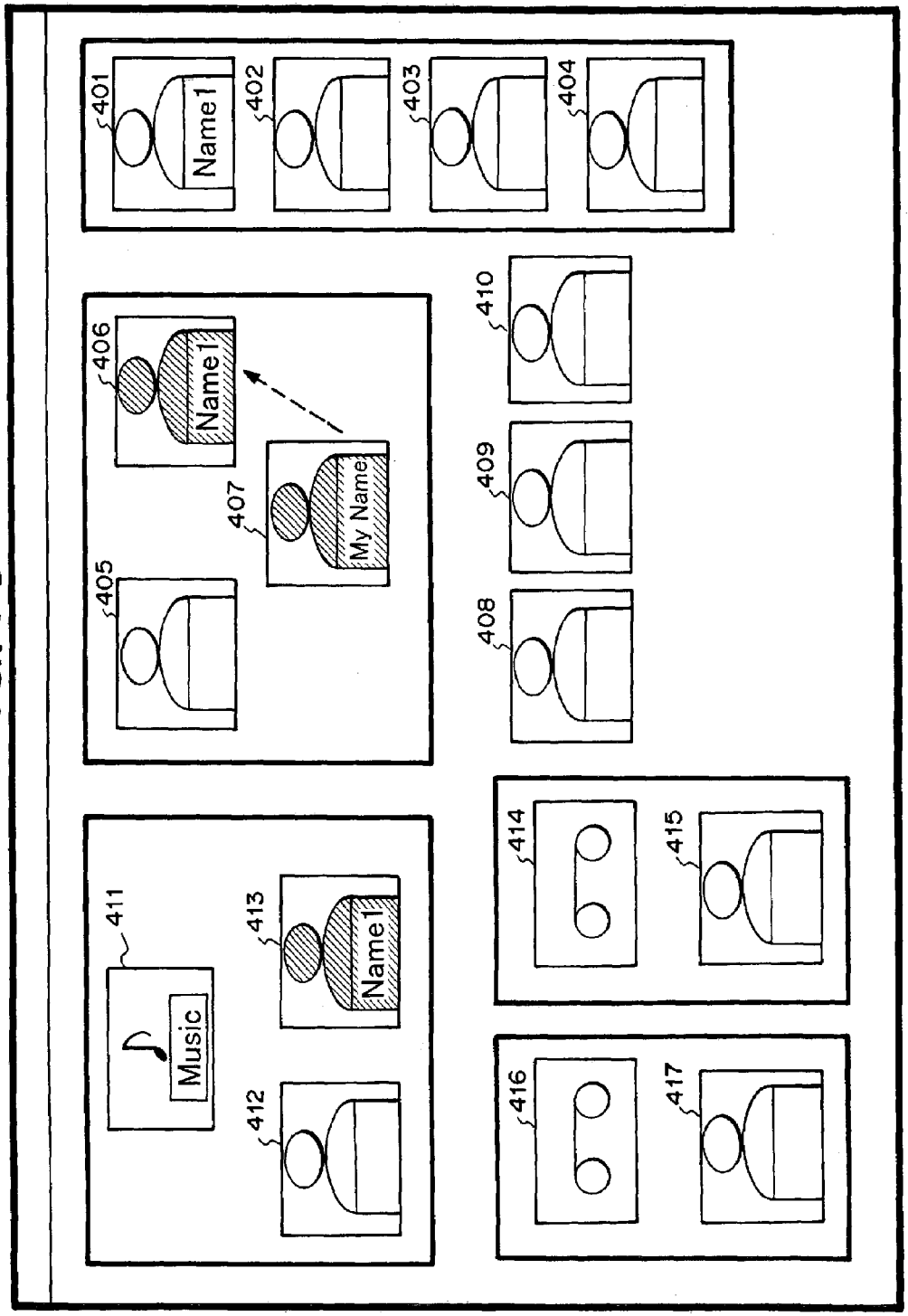
FIG. 13 is a diagram of a fourth screen displayed when transfer is performed by the terminal according to the embodiment of the present invention.

Next, the user A drags and drops the icon 401 representing an outside terminal (type: outside line, telephone number Y, name Z) to the icon 406 representing a destination terminal by the mouse on the screen of the terminal 101 to perform an outside-line outgoing operation. The terminal 101, then, updates the screen as shown in FIG. 12 into a screen as shown in FIG. 13, and transmits a "connection request" message including a connection request table having source information (type: extension, telephone number 101, name A) in the column 301, destination information (type: outside line, telephone number Y, name Y) in the column 302, and a connection direction (both directions) in the column 303 to the exchange apparatus 111. On the screen as shown in FIG. 13, a unidirectional dotted arrow extending from the icon 407 representing the self-terminal 101 to the icon 406 representing the destination terminal (outside terminal) is displayed.

Figure 14:
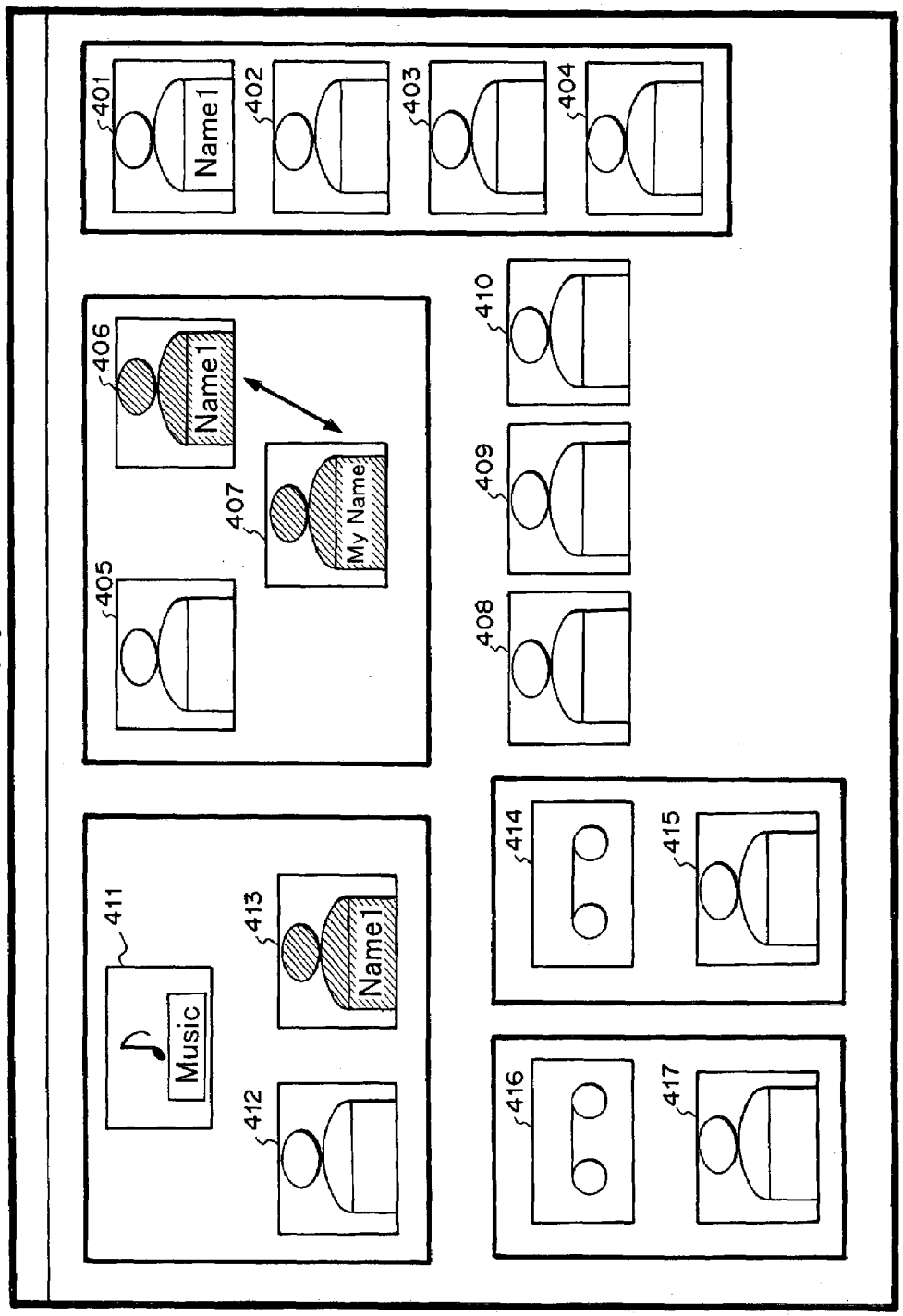
FIG. 14 is a diagram of a fifth screen displayed when transfer is performed by the terminal according to the embodiment of the present invention.

The exchange apparatus 111 which receives the "connection request" message refers to the current connection information table to check whether the destination of the terminal 101 is empty or not. The current connection information table shows that the terminal 102 and the reproducing device 107 of the exchange apparatus 111 are connected to each other. However, the current connection information table does not show that the terminal 102 is connected to any terminal and the exchange apparatus 111. For this reason, the exchange apparatus 111 decides that a signal can be generated from the terminal 101, captures the outside line L12, and dials the telephone number Y to perform an outside-line outgoing operation. When the outside line responds, the connection process between the outside line L12 and the terminal 101 is executed. Thereafter, a copy of the connection request table received from the terminal 101 is generated as a current connection information table, and a "connection table updating notice" message including the current connection information table is transmitted to the terminal 101. The terminal 101 which receives the "connection table updating notice" message updates the screen as shown in FIG. 13 into a screen as shown in FIG. 14. On the screen as in FIG. 14, a bidirectional arrow is displayed between the icon 407 representing the self-terminal 101 and the icon 406 representing the destination terminal (outside terminal).

Figure 15:
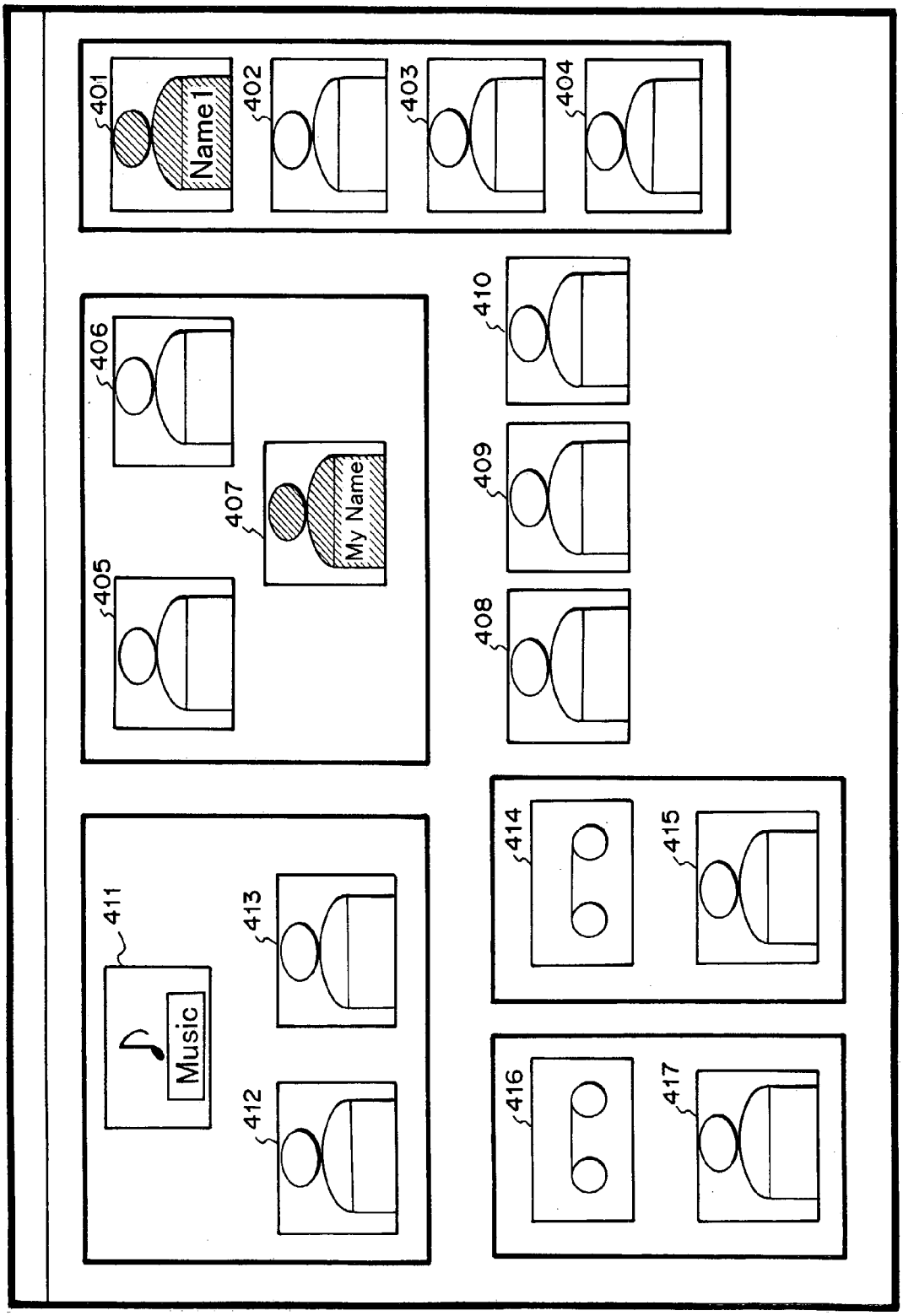
FIG. 15 is a diagram of a sixth screen displayed when transfer is performed by the terminal according to the embodiment of the present invention.

Thereafter, the user A drags and drops the icon 413 representing the holding terminal 102 to the icon 406 representing an outside destination communicating with the self-terminal 101 by the mouse on the screen of the terminal 101. The terminal 101, then, decides this operation as a transfer operation to transmit a "connection request" message including a connection request table having source information (type: extension, telephone number 102, name B) in the column 301, destination information (type: outside line, telephone number Y, name Z) in the column 302, and a connection direction (both directions) in the column 303 to the exchange apparatus 111. The exchange apparatus 111 which receives the "connection request" message compares the message with the current connection table to detect a difference therebetween. As a result, the terminal 101 is disconnected from the outside line L12, and the terminal 102 is connected to the outside line L12. Thereafter, the current connection table is updated, and a "connection table updating notice" message including the updated current connection table is transmitted to the terminals 101 and 102. The terminal 101 which receives the "connection table updating notice" message updates the screen as shown in FIG. 14 into a screen as shown in FIG. 15. On the screen in FIG. 15, since the terminal 102 and the outside terminal do not communicate with the terminal 101 at the present, an arrow connecting the terminal 101 and the terminal 102 and an arrow connecting the terminal 101 and the outside terminal are not displayed.

Next, a change in connection direction during a telephone call will be described below. It is assumed that the connection direction is sequentially changed into both directions, a forward direction, a backward direction, and muting while the terminal 101 and the terminal 102 are communicating with each other.

Figure 16:
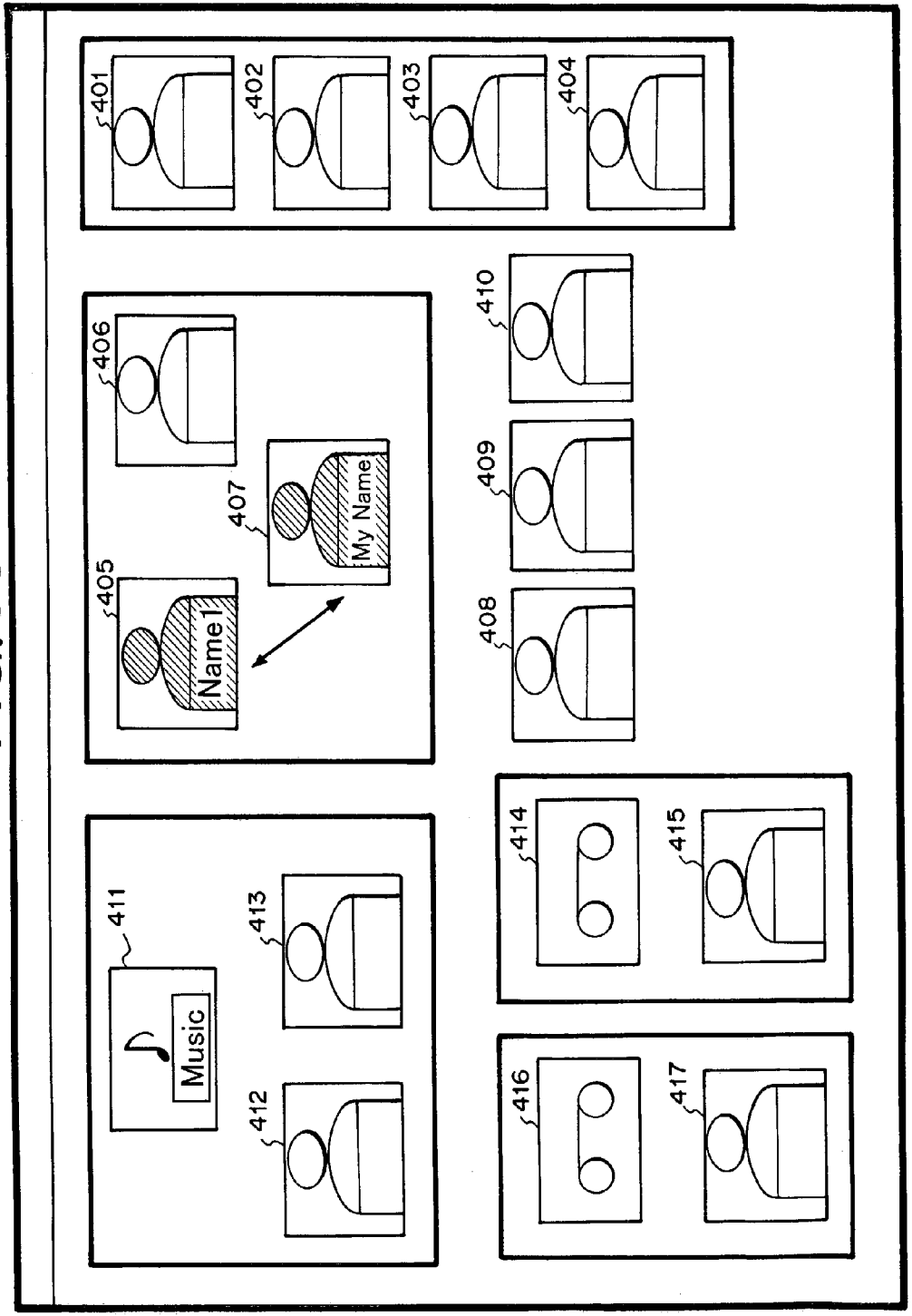
FIG. 16 is a diagram of the first screen displayed when a connection direction is switched by the terminal according to the embodiment of the present invention.

It is assumed that the terminal 101 and the terminal 102 have bidirectionally communicated with each other. At this time, the screen of the terminal 101 is as shown in FIG. 16. On the screen as shown in FIG. 16, a bidirectional arrow is displayed between the icon 407 representing the terminal 101 and the icon 405 representing the terminal 102.

Figure 17:
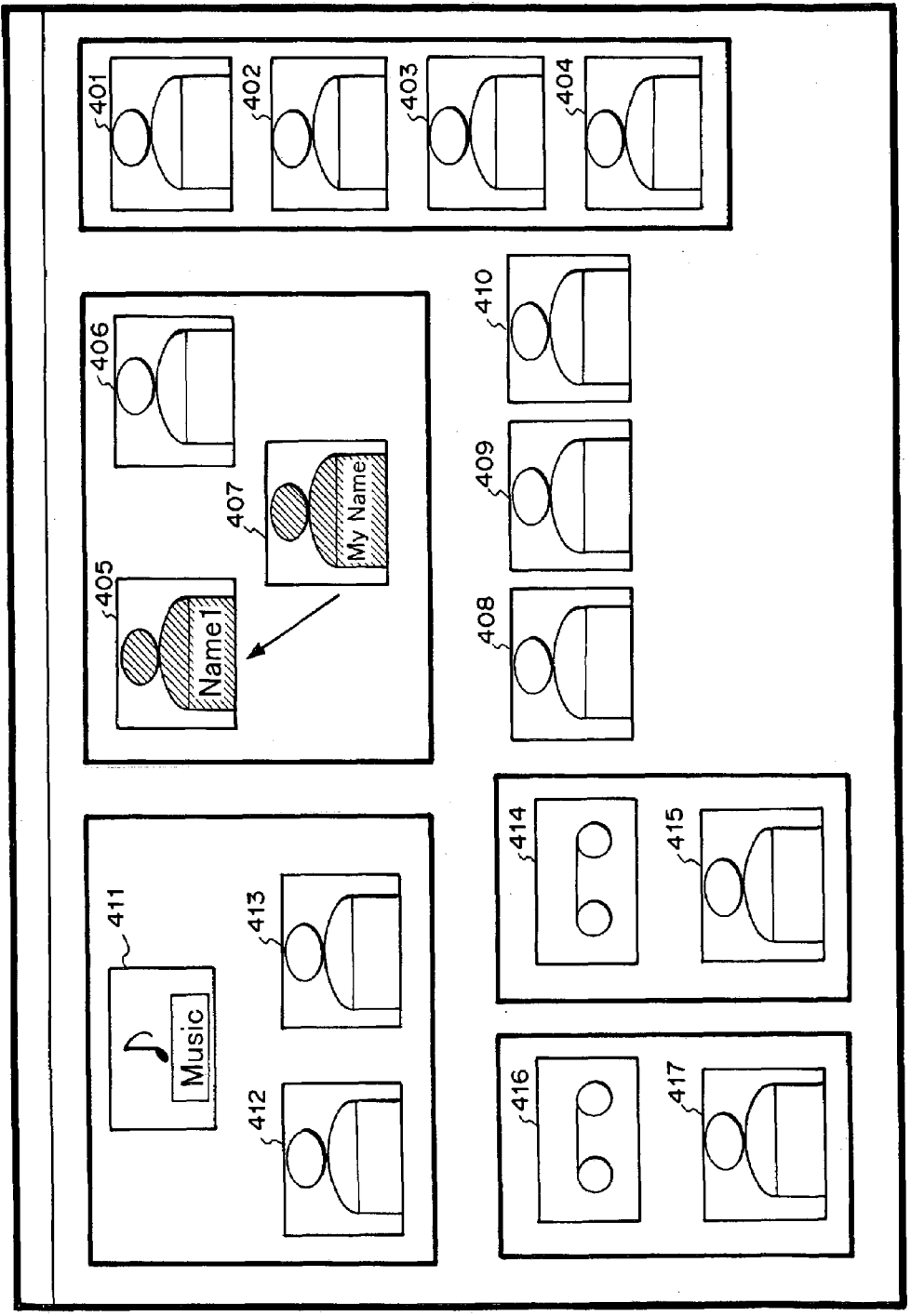
FIG. 17 is a diagram of the second screen displayed when the connection direction is switched by the terminal according to the embodiment of the present invention.

Here, the bidirectional arrow between the icon 407 representing the terminal 101 and the icon representing the terminal 102 is clicked by the user A by using a mouse. At this time, the terminal 101 recognizes this operation as a connection direction change operation and transmits a "connection request" message including a connection request table having source information (type: extension, telephone number 101, name A) in the column 301, destination information (type: extension, telephone number 102, name B) in the column 302, and a connection direction (forward direction) in the column 303 to the exchange apparatus 111. When the exchange apparatus 111 receives the "connection request" message, the exchange apparatus 111 compares the connection request table included in the "connection request" message with a current connection table to detect a difference therebetween. As a result, the connection direction between the terminal 101 and the terminal 102 is changed from both directions into a forward direction. When the connection direction is changed into the forward direction, although voice at the terminal 102 is transmitted to the terminal 101, voice at the terminal 101 is not transmitted to the terminal 102. The exchange apparatus 111 updates the current connection table to reflect the contents of the change and then transmits the "connection table updating notice" message including the updated current connection table to the terminal 101 and the terminal 102. When the terminal 101 receives the "connection table updating notice" message, the screen of the terminal 101 as shown in FIG. 16 is updated into a screen as shown in FIG. 17. On the screen in FIG. 17, a unidirectional solid arrow extending from the icon 407 representing the terminal 101 to the icon 405 representing the terminal 102 is displayed.

Figure 18:
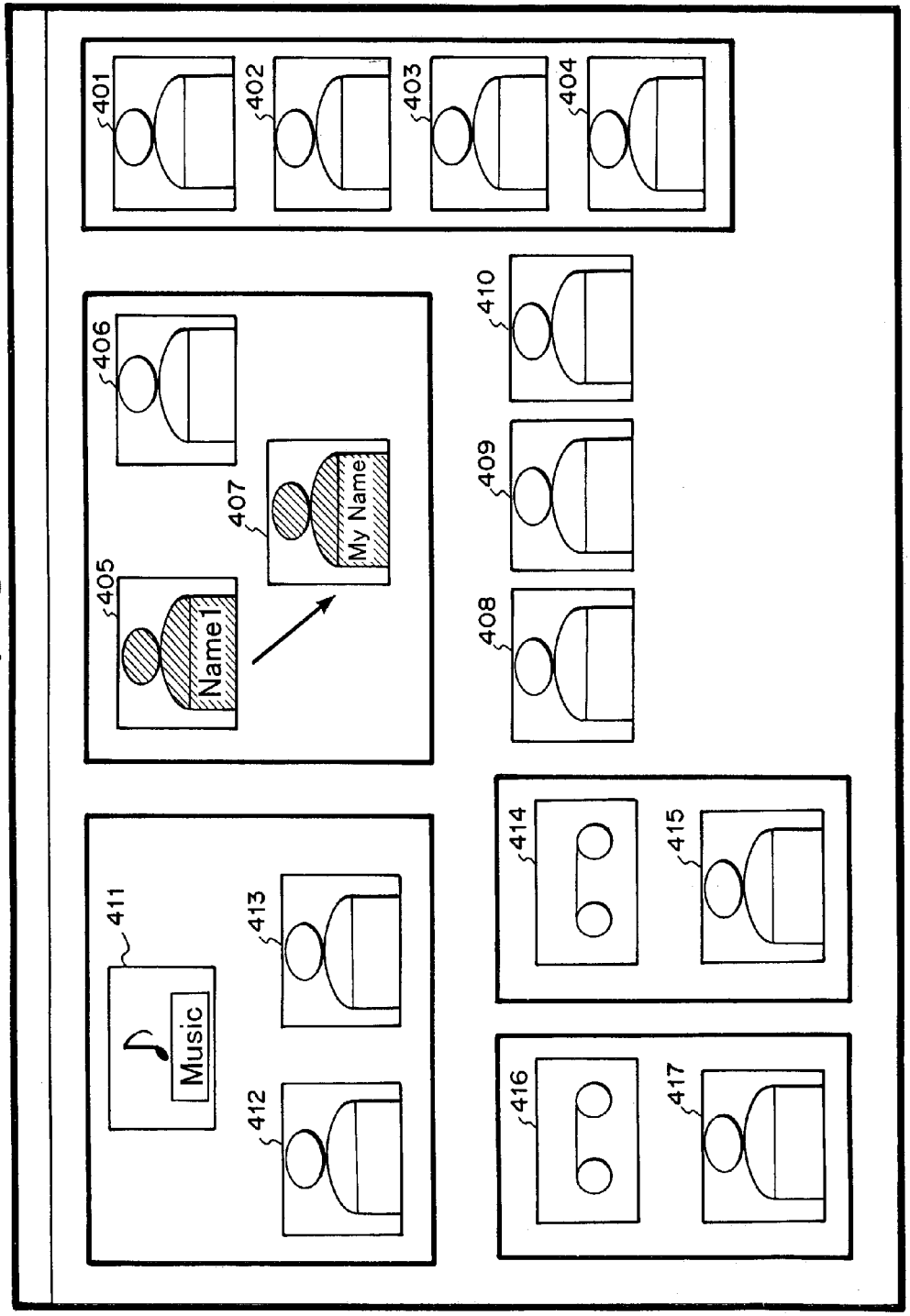
FIG. 18 is a diagram of the third screen displayed when the connection direction is switched by the terminal according to the embodiment of the present invention.
Figure 19:
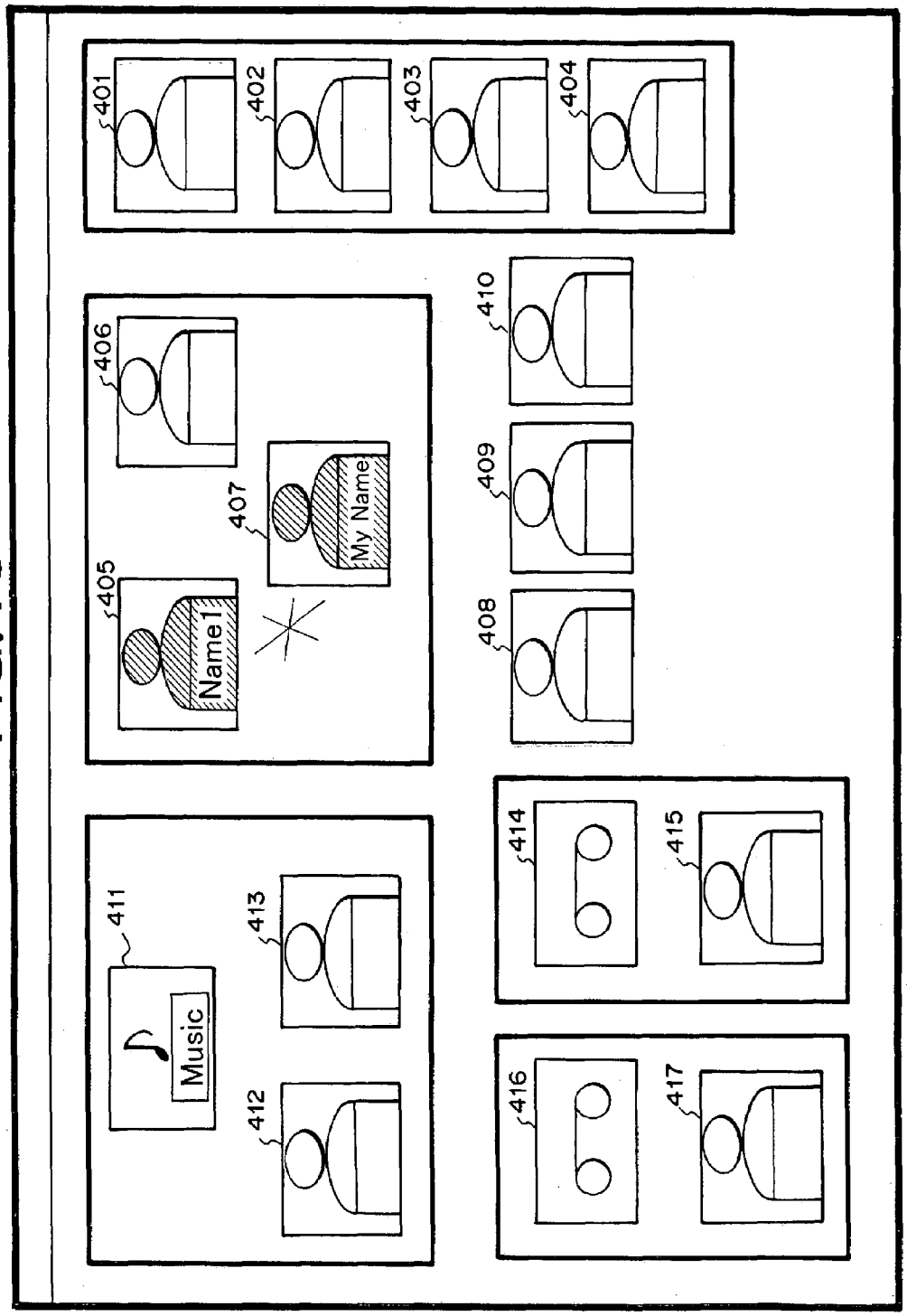
FIG. 19 is a diagram of the fourth screen displayed when the connection direction is switched by the terminal according to the embodiment of the present invention.

The same processes as described above are performed each time the arrow between the icon 407 representing the terminal 101 and the icon 405 representing the terminal 102 is clicked on the terminal 101. The screen of the terminal 101 is changed into a screen as shown in FIG. 18 (backward direction) or a screen as shown in FIG. 19 (muting). When the connection direction is set to be the backward direction, although voice at the terminal 101 is transmitted to the terminal 102, voice at the terminal 102 is not transmitted to the terminal 101. When the connection direction is set to be mute, the voice at the terminal 101 is not transmitted to the terminal 102, and the voice at the terminal 102 is not transmitted to the terminal 101, too.

Next, a case in which an incoming call is transferred to the recording device 108 will be described below. A call generated from the terminal 102 is received by the terminal 101, and the terminal 101 transfers the call to the recording device 108.

Figure 20:
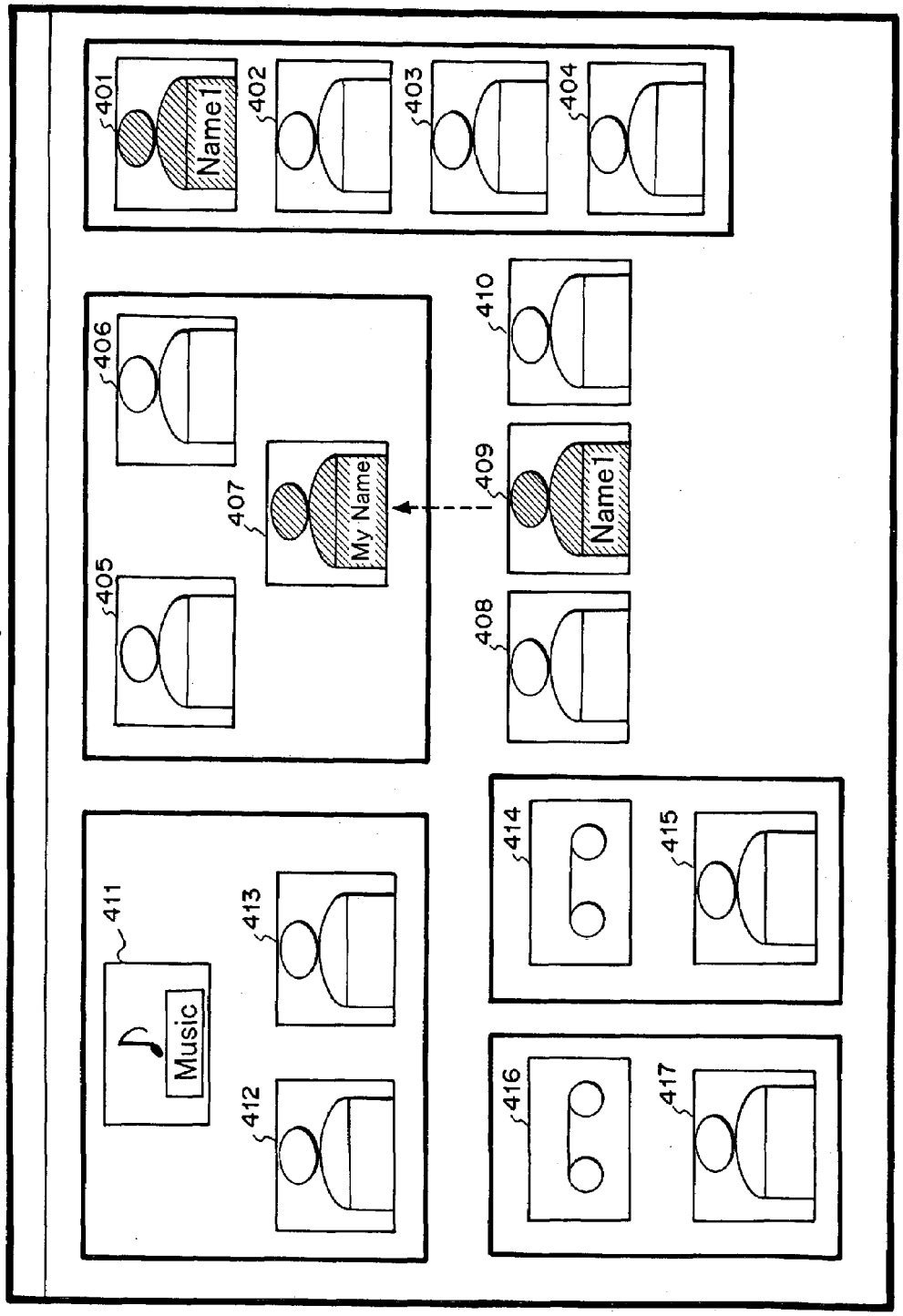
FIG. 20 is a diagram of the first screen displayed when a message from an answerphone is transferred by the terminal according to the embodiment of the present invention.

First, a "connection request" message which requests connection between the terminal 102 and the terminal 101 is transmitted from the terminal 102 to the exchange apparatus 111. When the exchange apparatus 111 receives the "connection request" message, the exchange apparatus 111 transmits a message representing that the terminal 101 is called by the terminal 102 to the terminal 101. When the terminal 101 receives the message representing that the terminal 101 is called by the terminal 102, the terminal 101 updates the screen into a screen as shown in FIG. 20 and notifies the user A that an incoming call generated from the terminal 102 is received. On the screen in FIG. 20, a unidirectional dotted arrow extending from the icon 409 representing the terminal 102 to the icon 407 representing the terminal 101 is displayed.

Figure 21:
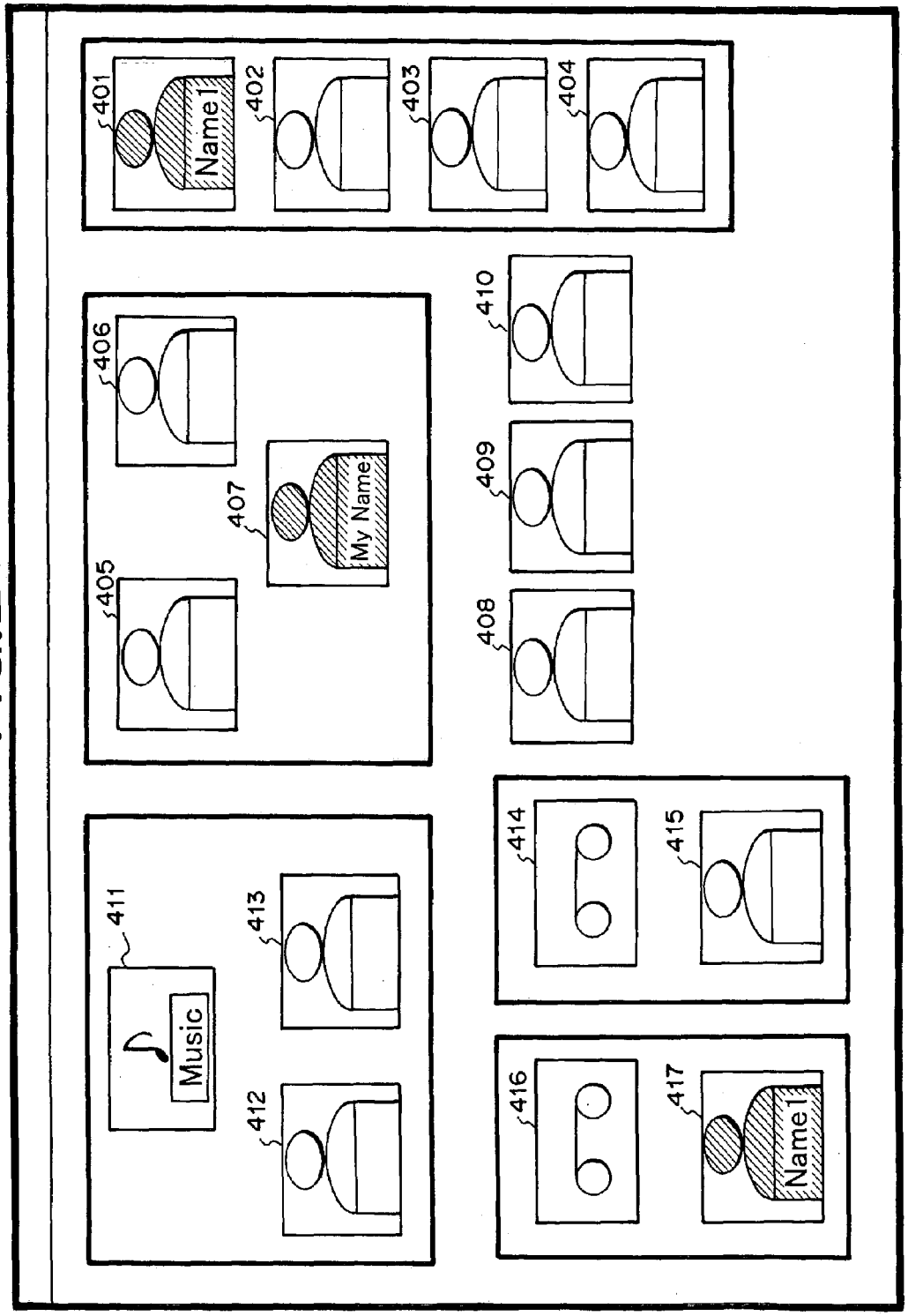
FIG. 21 is a diagram of the second screen displayed when a message from an answerphone is transferred by the terminal according to the embodiment of the present invention.

The user A cannot respond to the call request from the terminal 102 at present and intends to listen to only an essential point drags afterward. The user A drops the icon 409 representing the terminal 102 to the icon 417 representing the terminal 101 by using the mouse on the terminal 101. Alternatively, the user A may drag or drop the icon 409 representing the terminal 102 to the icon 416 representing the recording device 108 by using the mouse on the terminal 101. The terminal 101 transmits a "connection request" message including a connection request table having source information (type: extension, telephone number 102, name B) in the column 301, destination information (type: recording device 1, no telephone number, no name) in the column 302, and a connection direction (forward direction) in the column 303 to the exchange apparatus 111. When the exchange apparatus 111 receives the "connection request" message, the exchange apparatus 111 decides that an incoming request from the terminal 102 to the terminal 101 is rejected to establish connection depending on the connection request message sent from the terminal 101. More specifically, the terminal 102 is connected to the recording device 108. In this manner, voice from the terminal 102 is stored in the storage device 110 through the recording device 108. Upon completion of recording, the exchange apparatus 111 updates the current connection information table and transmits a "connection table updating notice" message including the updated current connection information table to the terminals 101 and 102. When the terminal 101 receives the "connection table updating notice" message, the terminal 101 updates the screen as shown in FIG. 20 into a screen as shown in FIG. 21. On the screen shown in FIG. 21, the recording terminal 417 is highlighted.

Next, a case in which telephone call recording is performed will be described below. The telephone conversation recording is to record voices of telephone conversation during a telephone call. In this case, a case in which telephone conversation between the terminal 101 and the terminal 102 is recorded by the terminal 101 will be exemplified.

Figure 22:
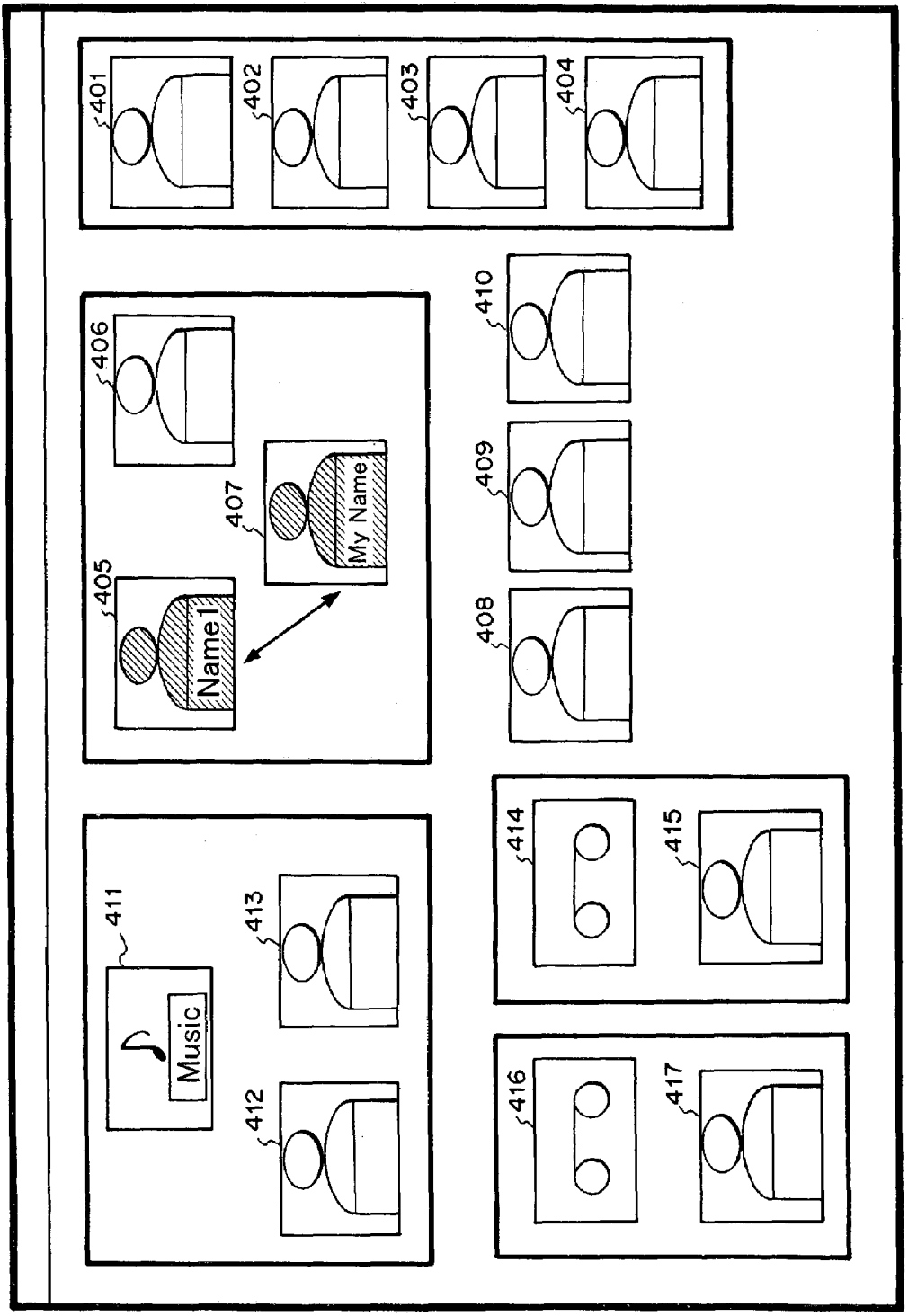
FIG. 22 is a diagram of the first screen displayed when telephone conversation recording is performed by the terminal according to the embodiment of the present invention.

It is assumed that the terminal 101 and the terminal 102 are set in a telephone call state. At this time, the screen of the terminal 101 is as shown in FIG. 22. On the screen in FIG. 22, a bidirectional solid arrow is displayed between the icon 407 representing the terminal 101 and the icon 405 representing the terminal 102.

The user A drags and drops the icon 414 representing the recording device 108 to the icon 405 representing the terminal 102 by the mouse on the terminal 101. The terminal 101, then, transmits a "connection request" message including: a first connection request table having source information (type: extension, telephone number 101, name A) in the column 301, destination information (type: extension, telephone number 102, name B) in the column 302, and a connection direction (both directions) in the column 303; a second connection request table having source information (type: extension, telephone number 101, name A) in the column 301, destination information (type: recording device 1, no telephone number, no name) in the column 302, and a connection direction (forward direction) in the column 303; and a third connection request table having source information (type: extension, telephone number 102, name B) in the column 301, destination information (type: recording device 1, no telephone number, no name) in the column 302, and a connection direction (forward direction) in the column 303 to the exchange apparatus 111.

Figure 23:
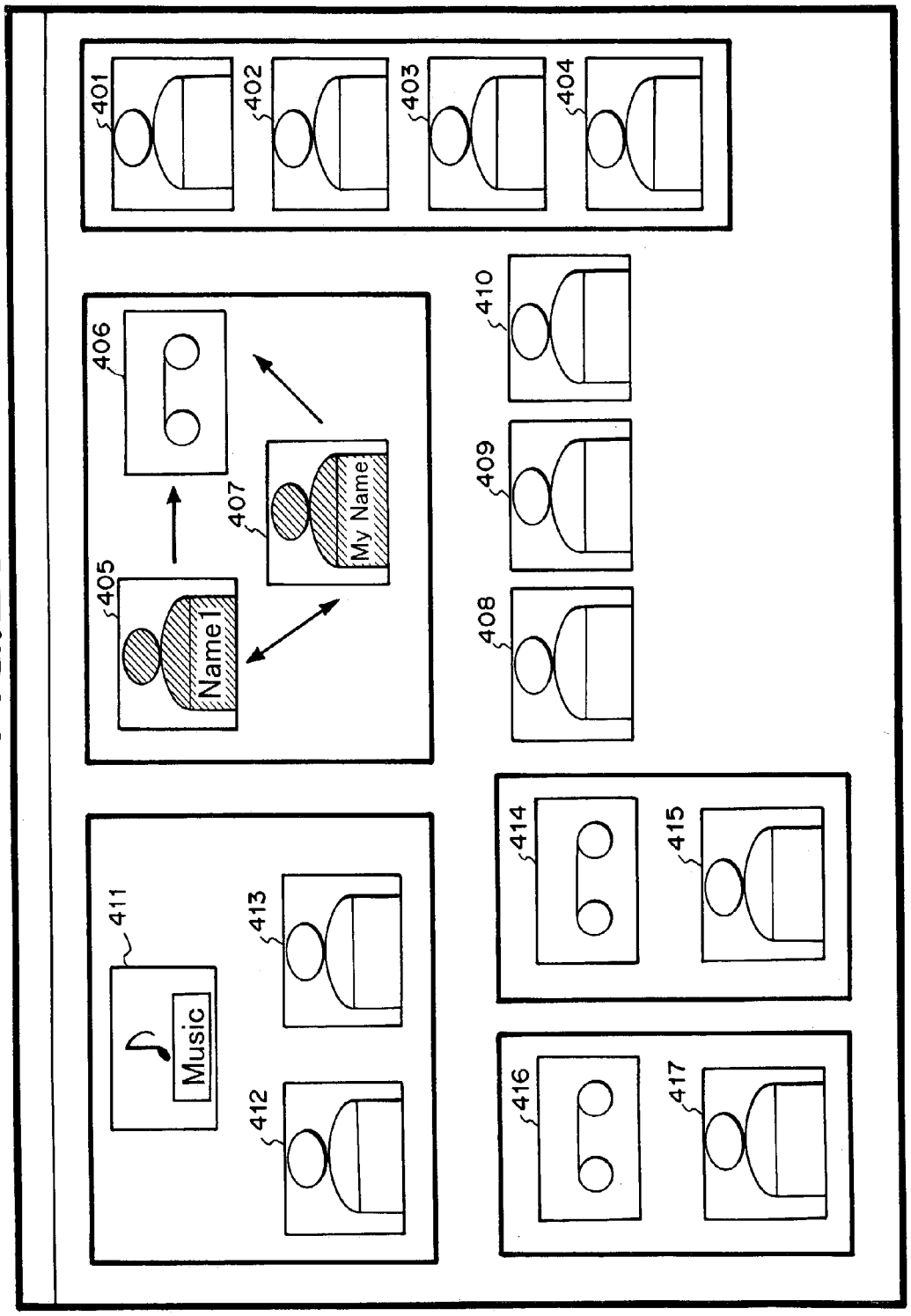
FIG. 23 is a diagram of the second screen displayed when a telephone call is recorded by the terminal according to the embodiment of the present invention.

When the exchange apparatus 111 receives the "connection request" message, the exchange apparatus 111 compares the three connection request tables included in the "connection request" massage with the current connection table to detect differences therebetween. The exchange apparatus 111 connects the terminal 101 and the recording device 108 to each other and connects the terminal 102 and the recording device 108 to each other. The terminal 101 and the terminal 102 have already been connected to each other. With these connections, telephone conversation between the terminal 101 and the terminal 102 is recorded on the storage device 110 by using the recording device 108. Thereafter, the current connection table is updated to reflect the contents of the three connection request tables and transmits a "connection table updating notice" message having the updated connection request tables to the terminals 101 and 102. When the terminal 101 receives the "connection table updating notice" message, the terminal 101 changes the screen into a screen as shown in FIG. 23. Recording is performed while the screen in FIG. 23 is displayed.

The exchange apparatus which handles voices and holding sounds has been described in the above embodiment. However, the present invention may be applied to an exchange apparatus which handles still images, moving images, or pieces of music in place of the above exchange apparatus. In this case, data flowing between a terminal or the exchange apparatus and a terminal are not voice data, but are data of still images, moving images, or pieces of music.

In the embodiment described above, although only a connection state related to a self-terminal is displayed on the screen of the self-terminal, the connection states of all the terminals managed by the exchange apparatus 111 may be displayed. In this case, on the screen of the exchange apparatus 111, sets of icons 405 to 407 are displayed to the number of terminals managed by the exchange apparatus.

In addition, a certain terminal may be used as a management terminal, and not only "connection table updating notice" messages related to the management terminal but also "connection table updating notice" messages related to terminals different from the management terminal may be transmitted to the management terminal, and the same screen as that of the exchange apparatus may be displayed on the management terminal.

The same screen as that of the exchange apparatus may be arranged on each terminal, so that a user can recognize whether a destination terminal is busy or not before calling the destination terminal.

In the embodiment, the "connection table updating notice" messages are transmitted to respective terminals. However, the contents of the "connection table updating notice" messages simultaneously transmitted to different terminals are equal to each other. If a group of a terminal which receives the "connection table updating notice" message is set in advance, then one "connection table updating notice" message is flowed into the extension line L21, and only terminals belonging to the group may read the message. Furthermore, when users listen to the same melody through a plurality of terminals, only one melody may be flowed into the extension line L21 to cause the plurality of terminals to pick up the melody. For this reason, the delay due to congestion of lines caused by flowing the same messages, the same voices, or the same pieces of music on the extension line L21 is prevented. In addition, the delay of data preparation due to overload for the exchange apparatus to generate the same messages, the same voices, and the same pieces of music can be prevented.

In the above embodiment, although drag and drop performed by a mouse are used as an operation method, any operation method which designates a source icon to be dragged and a destination icon on which the source icon is to be dropped may be used. For example, an operation method in which the source icon and an the destination icon are clicked by a mouse is used, or a touch panel may be used in place of the mouse.

In the above embodiment, an effect obtained when the first icon is dragged and dropped to the second icon may be obtained when the second icon is dragged and dropped to the first icon.

In the above embodiment, only the three icons, i.e., the icon 407 representing the self-terminal and the icons 405 and 406 representing the destination terminals in a telephone call are displayed. In this display, only a connection state among a maximum of three persons can displayed. However, when icons representing destination terminals in a telephone call are increased in number, a connection state among four or more persons can also be displayed. The numbers of destinations, call originating terminals, recording terminals, and holding terminals for holding sound may be increased depending on the specifications of exchange apparatuses.

In the above embodiment, although only the single icon 411 is used as an icon representing a holding sound source, a plurality of icons representing holding sound sources may be displayed. In this case, sets of icons 411, 412, and 413 may be arranged in respective windows. In this connection, the different sets may use holding sounds having different melodies, respectively. In order to realize this, a plurality of melody files should be stored in the storage device 110, and the melody files to be reproduced are changed depending on the selected set. In addition, melody files may be changed by uploading a melody file from a terminal. In this case, a pop-up menu for uploading a file is displayed by an operation performed by right-clicking the icon 411 representing the holding sound source by the mouse to make it possible to select one of melody files held by a terminal, and the selected file may be transmitted from the storage device 211 of the terminal to the storage device 110 of the exchange apparatus.

In the above embodiment, connection between the self-terminal and the holding sound source is not described. However, the exchange apparatus may have the following function. That is, for example, the self-terminal and the holding sound source are connected to each other by dragging and dropping the icon 411 representing the holding sound source to the icon 407 representing the self-terminal, so that a user easily listens a holding melody through the self-terminal.

In the above embodiment, a telephone conference call is not described. However, for example, when the icon 401 representing a registered destination is dragged and dropped to the icon 405 representing a destination terminal, and the icon 402 representing another registered destinations is dragged and dropped to the icon 406 representing another destination terminal, so that a telephone conference is enabled.

In the above embodiment, only cases in which a connection request of the terminal 101 is accepted by any other terminals is described. However, a connection request accepted by the terminals may be restricted. In this case, connection authorities for the terminals are set to the storage device 110 of the exchange apparatus 111 in advance. When the exchange apparatus 111 receives a "connection request" message, the exchange apparatus 111 decides whether a destination will accept the connection request from the source or not with reference to the storage device 101. If the destination refuses the "connection request", the exchange apparatus 111 transmits a "request rejection" message to the source which has transmitted the "connection request" message without performing a connection process.

In the above embodiment, a function of listening to the contents of voice message through a self-terminal in real time while a partner terminal which originated a call records the voice message on an answerphone recording device is not described. However, this function can be realized by any one of the following two methods. The first method is as follows. When the icons 408, 409, or 410 representing the terminal calling the self-terminal is dragged and dropped to the icon 405 representing a destination terminal, and when the icon 414 or 416 representing a recording device is dragged and dropped to the icon 406 representing another destination terminal, the calling terminal and the self-terminal are connected to each other in a direction from the calling terminal and the self-terminal, and the self-terminal and the recording device are connected to each other in a direction from the self-terminal to the recording device. The second method is as follows. When the icons 408, 409, or 410 representing the terminal calling the self-terminal is dragged and dropped to the icon 405 representing a destination terminal, and when the icon 414 or 416 representing a recording device is dragged and dropped to the icon 405 representing another destination terminal, the calling terminal and the self-terminal are connected to each other in a direction from the calling terminal and the self-terminal, and the self-terminal and the recording device are connected to each other in a direction from the self-terminal to the recording device.

According to the present invention, a change in connection and the like can be executed by an integrated and intuitive operation, the trouble of learning operation methods by reading manuals for respective functions can be eliminated, and erroneous operations can be prevented.

According to the present invention, all the connections and incoming states for a self-terminal are visually displayed to make it possible that a user recognizes the connections and incoming states state at a glance and to make it easier to perform an operation of responding to important incoming with priority. In addition, when connection states of other terminals are displayed on a screen, it can be recognized whether a destination terminal is busy or not before an outgoing operation is performed, and useless outgoing operations can be reduced.

According to the present invention, since even a "connection change request" is sent for connection which is not related to a self-terminal to make it possible to change the connection, and a "connection table updating notice" can be sent to any terminal from an exchange apparatus with respect to a connection state, even an unrelated terminal can recognize connection states of other apparatuses. Thus, an entire connection state can be recognized by a management terminal and the like, and hindrance or illegal use of terminals can be early detected.

What is claimed is:

1. An exchange system comprising:
   display means for displaying icons of various terminals on screens of terminals;
   detection means for detecting association between the icons performed on the screens of the terminals; and
   control means for controlling connection and disconnection between the terminals and/or connection and disconnection between an exchange apparatus and the terminal depending on the contents of the association between the icons performed on the screens of the terminals detected by said detection means,
   wherein the control means comprises means for transmitting a connection request message including a connection request table from the terminals to the exchange apparatus,
   wherein the exchange apparatus comprises means for updating the contents of a current connection information table, on the basis of the contents of the connection request table included in the connection request message received from the terminals and the contents of the current connection information table.

2. The exchange system according to claim 1, further comprising:
   means for displaying an icon of a destination terminal and an icon of a registered terminal on the screens of the terminals;
   means for detecting that an association operation between the icon of the destination terminal and the icon of the registered terminal serving as a second terminal is performed on the screen of a first terminal; and
   means for generating a call from the first terminal to the second terminal when the association operation between the icon of the destination terminal and the icon of the registered terminal serving as the second terminal is detected.

3. The exchange system according to claim 1, further comprising:
   means for displaying an icon of a destination terminal and an icon of a call originating terminal on the screens of the terminals;
   means for activating the icon of the call originating terminal displayed on the screen of the destination terminal serving as a second terminal when a call sent from the call originating terminal serving as a first terminal to the second terminal is generated;
   means for detecting that an association operation between the icon of the destination terminal and the icon of the call originating terminal is performed on the screen of the second terminal; and
   means for establishing connection between the first terminal and the second terminal when the association operation between the icon of the destination terminal and the icon of the call originating terminal is detected on the screen of the second terminal.

4. The exchange system according to claim 1, further comprising:
   means for displaying an icon of a destination terminal and an icon of a holding terminal on the screens of the terminals;
   means for detecting that an association operation between the icon of the destination terminal and the icon of the holding terminal is performed on a screen of a certain terminal; and
   means for setting the certain terminal in a telephone call holding state when the association operation between the icon of the destination terminal and the icon of the holding terminal is detected on the screen of the certain terminal.

5. The exchange system according to claim 4, wherein the icon of the holding terminal is increased to a plurality of icons of the holding terminals, and a melody used in the holding state is changed depending on the icon of the holding terminal associated with the icon of the destination terminal.

6. The exchange system according to claim 1, further comprising:
   means for displaying an icon of a destination terminal and an icon of a holding terminal on the screens of the terminals;
   means for detecting that an association operation between the icon of the destination terminal and the icon of the holding terminal is performed on a screen of a certain terminal; and
   means for connecting the holding destination terminal and the destination terminal which is communicating with the certain terminal when the association operation between the icon of the destination terminal and the icon of the holding terminal is detected on the screen of the certain terminal.

7. The exchange system according to claim 1, further comprising:
   means for displaying an icon of a destination terminal, an icon of a self-terminal, and a graphic connecting the icon of the destination terminal and the icon of the self-terminal on the screens of the terminals;
   means for detecting that the graphic is operated on a screen of a certain terminal; and
   means for switching a telephone call direction between the certain terminal and the destination terminal with which the certain terminal communicates when the graphic is operated on the screen of the certain terminal.

8. The exchange system according to claim 1, further comprising means for displaying an icon of a call originating terminal and an icon of a recording terminal on the screens of the terminals;

means for detecting that an association operation between the icon of the call originating terminal and the icon of the recording terminal is performed on a screen of a certain terminal; and means for recording voice from the call originating terminal when the association operation between the icon of the call originating terminal and the icon of the recording terminal is detected on the screen of the certain terminal.

9. The exchange system according to claim 1, further comprising means for displaying an icon of a call originating terminal and an icon of a recording device on the screens of the terminals;

means for detecting that an association operation between the icon of the call originating terminal and the icon of the recording device is performed on a screen of a certain terminal; and means for recording voice from the call originating terminal when the association operation between the icon of the call originating terminal and the icon of the recording device is detected on the screen of the certain terminal.

10. The exchange system according to claim 1, further comprising:

means for displaying an icon of a destination terminal and an icon of a recording device on the screens of the terminals;

means for detecting that an association operation between the icon of the destination terminal and the icon of the recording device is performed on a screen of a certain terminal; and means for recording voice of telephone conversation between the certain terminal and the destination terminal with which the certain terminal communicates when the association operation between the icon of the destination terminal and the icon of the recording device is detected on the screen of the certain terminal.

11. The exchange system according to claim 1, wherein the connection request table included in the connection request message contains source information, destination information, and a connection direction depending on the contents of the association detected by the detection means.

12. The exchange system according to claim 1, wherein the exchange apparatus further comprises means for transmitting a connection table updating notice message including the updated connection information table to a related terminal.

13. The exchange system according to claim 12, wherein each of the terminals comprises means for updating a display of the screen on the basis of the connection information table included in the connection table updating notice message received from the exchange apparatus.

14. The exchange system according to claim 1, wherein, when a plurality of terminals receive data of the same contents from the exchange apparatus, only a piece of data is transmitted from the exchange apparatus to an extension line.

15. An exchange method comprising:

displaying icons of various terminals on screens of terminals;

detecting association between the icons performed on the screens of the terminals; and controlling connection and disconnection between the terminals and/or connection and disconnection between an exchange apparatus and the terminal depending on the contents of the association, wherein controlling connection and disconnection comprises transmitting a connection request message including a connection request table from the terminals to the exchange apparatus, wherein the exchange apparatus comprises updating the contents of a current connection infonnation table, on the basis of the contents of the connection request table included in the connection request message received from the terminals and the contents of the current connection information table.

16. The exchange method according to claim 15, further comprising:

displaying an icon of a destination terminal and an icon of a registered terminal on the screens of the terminals;

detecting that an association operation between the icon of the destination terminal and the icon of the registered terminal serving as a second terminal is performed on the screen of a first terminal; and generating a call from the first terminal to the second terminal when the association operation between the icon of the destination terminal and the icon of the registered terminal serving as the second terminal is detected on the screen of the first terminal.

17. The exchange method according to claim 15, further comprising:

displaying an icon of a destination terminal and an icon of a call originating terminal on the screens of the terminals;

activating the icon of the call originating terminal displayed on the screen of the destination terminal serving as a second terminal when a call sent from the call originating terminal serving as a first terminal to the second terminal is generated;

detecting that an association operation between the icon of the destination terminal and the icon of the call originating terminal is performed on the screen of the second terminal; and establishing connection between the first terminal and the second terminal when the association operation between the icon of the destination terminal and the icon of the call originating terminal is detected on the screen of the second terminal.

18. The exchange method according to claim 15, further comprising:

displaying an icon of a destination terminal and an icon of a holding terminal on the screens of the terminals;

detecting that an association operation between the icon of the destination terminal and the icon of the holding terminal is performed on a screen of a certain terminal; and setting the certain terminal in a telephone call holding state when the association operation between the icon of the destination terminal and the icon of the holding terminal is detected on the screen of the certain terminal.

19. The exchange method according to claim 18, wherein the icon of the holding terminal is increased to a plurality of icons of the holding terminals, and a melody used in the holding state is changed depending on the icon of the holding terminal associated with the icon of the destination terminal.

20. The exchange method according to claim 15, further comprising:

displaying an icon of a destination terminal and an icon of a holding terminal on the screens of the terminals;

detecting that an association operation between the icon of the destination terminal and the icon of the holding terminal is performed on a screen of a certain terminal; and connecting the holding destination terminal and the destination terminal which is communicating with the certain terminal when the association operation between the icon of the destination terminal and the icon of the holding terminal is detected on the screen of the certain terminal.

21. The exchange method according to claim 15, further comprising:
displaying an icon of a destination terminal, an icon of a self-terminal, and a graphic connecting the icon of the destination terminal and the icon of the self-terminal on the screens of the terminals;
detecting that the graphic is operated on a screen of a certain terminal; and
switching a telephone call direction between the certain terminal and the destination terminal with which the certain terminal communicates when the graphic is operated on the screen of the certain terminal.

22. The exchange method according to claim 15, further comprising:
displaying an icon of a call originating terminal and an icon of a recording terminal on the screens of the terminals;
detecting that an association operation between the icon of the call originating terminal and the icon of the recording terminal is performed on a screen of a certain terminal; and
recording voice from the call originating terminal when the association operation between the icon of the call originating terminal and the icon of the recording terminal is detected on the screen of the certain terminal.

23. The exchange method according to claim 15, further comprising:
displaying an icon of a call originating terminal and an icon of a recording device on the screens of the terminals;
detecting that an association operation between the icon of the call originating terminal and the icon of the recording device is performed on a screen of a certain terminal; and
recording voice from the call originating terminal when the association operation between the icon of the call originating terminal and the icon of the recording device is detected on the screen of the certain terminal.

24. The exchange method according to claim 15, further comprising:
displaying an icon of a destination terminal and an icon of a recording device on the screens of the terminals;
detecting that an association operation between the icon of the destination terminal and the icon of the recording device is performed on a screen of a certain terminal; and
recording voice of telephone conversation between the certain terminal and the destination terminal with which the certain terminal communicates when the association operation between the icon of the destination terminal and the icon of the recording device is detected on the screen of the certain terminal.

25. The exchange method according to claim 15, wherein the connection request table included in the connection request message contains source information, destination information, and a connection direction depending on the contents of the association by detecting association between the icons.

26. The exchange method according to claim 15, wherein the exchange apparatus further comprises transmitting a connection table updating notice message including the updated connection information table to a related terminal.

27. The exchange method according to claim 26, wherein each of the terminals comprises updating a display of the screen on the basis of the connection information table included in the connection table updating notice message received from the exchange apparatus.

28. The exchange method according to claim 15, wherein, when a plurality of terminals receive data of the same contents from the exchange apparatus, only a piece of data is transmitted from the exchange apparatus to an extension line.

29. An exchange system comprising:
a liquid crystal display screen for displaying icons of various terminals on screens of terminals;
an input control device for detecting association between the icons performed on the screens of the terminals; and
a central processing unit for controlling connection and disconnection between the terminals and/or connection and disconnection between a telephone exchange and the terminal depending on the contents of the association between the icons performed on the screens of the terminals detected by said input control device,
wherein the central processing unit transmits a connection request message including a connection request table from the terminals to the telephone exchange,
wherein the telephone exchange updates the contents of a current connection information table, on the basis of the contents of the connection request table included in the connection request message received from the terminals and the contents of the current connection information table.

30. An exchange system comprising:
a management terminal;
a display that displays icons of a plurality of terminals on a screen of the management terminal;
a detection circuit that detects association between the icons performed on the screen of the management terminal, wherein a management terminal icon of the management terminal displayed on the screen of the management terminal is in a communication-ready state by default; and
a control circuit that controls connection and disconnection between the plurality of the terminals depending on the contents of the association between the icons performed on the screen of the management terminal detected by the detection circuit.

31. An exchange system comprising:
display means for displaying icons of a plurality of terminals on screens of the plurality of the terminals and displaying a call originating state, a call-in state, and a connection state by using the icons;
detection means for detecting association between the icons performed on the screens of the plurality of the terminals; and
control means for controlling connection and disconnection between the plurality of the terminals and/or connection and disconnection between an exchange apparatus and a terminal among the plurality of terminals depending on the contents of the association,
wherein the control means comprises:
means for transmitting a connection request message including a connection request table having connection source information, connection destination information, and a connection direction depending on the contents of the association detected by the detection means from the plurality of the terminals the icons of which are associated with each other to the exchange apparatus;
means for comparing the connection request table transmitted to the exchange apparatus with one or more present connection information table managed by the exchange apparatus and having the connection source information, the connection destination information, and the connection direction;

means for performing a connection process on the basis of a result of at least the comparison;

means for updating the present connection information table, reflecting the connection process; and means for transmitting a connection table updating notification message having a table having the connection source information, the connection destination information, and the connection direction which reflect the updating of the present connection information table from the exchange apparatus to at least one terminal of the plurality of the terminals including the terminals the icons of which are associated with each other, wherein display means of the plurality of the terminals the icons of which are associated with each other update the displays on the basis of the association, wherein the display means of at least one terminal among the plurality of the terminals including the terminals the icons of which are associated with each other, the terminal receiving the connection table updating notification message from the exchange apparatus, updates the display means on the basis of the connection table updating notification message, and wherein the connection direction is any one of both directions, a forward direction, a backward direction, and mute depending on a connection relationship.

32. An exchange method comprising:

displaying icons of a plurality of terminals on screens of plurality of the terminals and displaying a call originating state, a call-in state, and a connection state by using the icons;

detecting association between the icons performed on the screens of the plurality of the terminals; and controlling connection and disconnection between the plurality of the terminals and/or connection and disconnection between an exchange apparatus and a terminal among the plurality of the terminals depending on the contents of the association, wherein the controlling the connection and the disconnection comprises:

transmitting a connection request message including a connection request table having connection source information, connection destination information, and a connection direction depending on the contents of the association detected by the detecting the association from the plurality of the terminals the icons of which are associated with each other to the exchange apparatus;

comparing the connection request table transmitted to the exchange apparatus with one or more present connection information table managed by the exchange apparatus and having the connection source information, the connection destination information, and the connection direction;

performing a connection process on the basis of a result of at least the comparison;

updating the present connection information table, reflecting the connection process; and transmitting a connection table updating notification message having a table having the connection source information, the connection destination information, and the connection direction which reflect the updating of the present connection information table from the exchange apparatus to at least one terminal among the plurality of the terminals including the terminals the icons of which are associated with each other, wherein display means of the plurality of the terminals the icons of which are associated with each other update the displays on the basis of the association, wherein the display means of at least one terminal among the plurality of the terminals including the terminals the icons of which are associated with each other, the terminal receiving the connection table updating notification message from the exchange apparatus, updates the display means on the basis of the connection table updating notification message, and wherein the connection direction is any one of both directions, a forward direction, a backward direction, and mute depending on a connection relationship.

* * * * *